United States Patent
Drake et al.

(10) Patent No.: US 9,738,127 B2
(45) Date of Patent: Aug. 22, 2017

(54) ADJUSTABLE HEIGHT GOOSENECK COUPLER

(71) Applicant: Cequent Performance Products, Inc., Plymouth, MI (US)

(72) Inventors: Frank Drake, Wausau, WI (US); Kevin Rabska, Junction City, WI (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 0 days.

(21) Appl. No.: 13/800,357

(22) Filed: Mar. 13, 2013

(65) Prior Publication Data

US 2013/0277944 A1 Oct. 24, 2013

Related U.S. Application Data

(60) Provisional application No. 61/635,017, filed on Apr. 18, 2012.

(51) Int. Cl.
*B60D 1/46* (2006.01)
*B60D 1/06* (2006.01)

(52) U.S. Cl.
CPC ........ *B60D 1/46* (2013.01); *B60D 1/06* (2013.01)

(58) Field of Classification Search
CPC .......... B60D 1/015; B60D 1/06; B60D 1/065; B60D 1/46; B62D 53/061; B62D 53/065
USPC ......... 280/417.1, 425.2, 441.2, 490.1, 491.1, 280/495, 496, 511
See application file for complete search history.

(56) References Cited

U.S. PATENT DOCUMENTS

| | | | | |
|---|---|---|---|---|
| 4,283,073 A | * | 8/1981 | Gostomski et al. | 280/508 |
| 5,354,087 A | * | 10/1994 | Head | 280/490.1 |
| 5,382,109 A | | 1/1995 | Nyman | |
| 5,868,415 A | * | 2/1999 | Van Vleet | B60D 1/065 |
| | | | | 280/483 |
| 6,234,509 B1 | | 5/2001 | Lara | |
| 6,505,849 B1 | | 1/2003 | Ebey | |
| 6,776,431 B1 | * | 8/2004 | Dick | 280/425.2 |
| 8,286,986 B2 | | 10/2012 | Drake et al. | |
| 2003/0001362 A1 | * | 1/2003 | Ebey | 280/441.2 |
| 2003/0047908 A1 | | 3/2003 | Lara | |
| 2005/0253361 A1 | * | 11/2005 | Bouwkamp | 280/441.2 |
| 2012/0153598 A1 | | 6/2012 | Drake et al. | |
| 2012/0211965 A1 | | 8/2012 | Drake et al. | |
| 2012/0211966 A1 | | 8/2012 | Drake et al. | |

* cited by examiner

*Primary Examiner* — Tony Winner
*Assistant Examiner* — Marlon A Arce
(74) *Attorney, Agent, or Firm* — McDonald Hopkins LLC

(57) ABSTRACT

A gooseneck coupler may be used on a towing vehicle to help tow certain types of towed vehicles, such as trailers. The gooseneck coupler may include a hitch ball attachment member selectively securable to a hitch ball of a towing vehicle, and a support member attached to the hitch ball attachment member, the support member including first and second ends. The gooseneck coupler may also include a trailer attachment member configured to secure a portion of a towed vehicle thereto, the trailer attachment member positionable on the support member between the first and second ends of the support member, where the support member is free of a telescoping relation with the trailer attachment member.

16 Claims, 26 Drawing Sheets

ADJUSTABLE HEIGHT GOOSENECK COUPLER

CROSS-REFERENCE TO RELATED APPLICATIONS

This application claims benefit from U.S. Provisional Application Ser. No. 61/635,017, entitled "Planar Mount Adjustable Height Gooseneck Coupler" filed on Apr. 18, 2012, which is hereby incorporated in its entirety by reference.

FIELD OF THE INVENTION

The present invention is generally related to a gooseneck coupler for securing a towed vehicle to a towing vehicle and, more particularly, to an adjustable height gooseneck coupler.

BACKGROUND

Vehicles often transport freight, goods, merchandise, personal property, and other large cargo. Often, these vehicles may be arranged to transport such through the use of a towed vehicle, such as for example a trailer. The towing industry has developed a number of methods and apparatuses for securing or engaging the towed vehicle to the towing vehicle, such as to secure a trailer to a pick-up truck. For example, the towed vehicle may be secured to the towing vehicle through use of a preselected towing hitch.

There are many different types of towing hitches in the art that may be attached to the towing vehicle in a variety of ways depending on the type of towed vehicle and towing vehicle involved. Some of the most common types of hitches include gooseneck coupler, fifth wheel hitches, and rear mounted hitches.

Some towed vehicles may be designed to carry heavy loads. When a towed vehicle load is heavy as compared to the weight of the towing vehicle, applying the towed vehicle load generally over or in front of the rear axle of the towing vehicle may create a more desirable towing condition. In addition, such an arrangement may put much of the force of the towed vehicle load onto structural members of the towing vehicle, such as the frame, whereby the hitch ball may be located, for example, in the truck bed.

There are generally two arrangements for securing a towed vehicle to the bed of a towing vehicle—a fifth wheel hitch and a gooseneck coupler. A fifth wheel hitch may be utilized with towed vehicles having a king pin, which may be part of a pin box attached to the towed vehicle. Fifth wheel hitches may generally be attached in a bed of a truck or directly to the frame of the truck in a more permanent manner, whereby tools may generally be required to remove fasteners and other connectors to install or uninstall a fifth wheel hitch to the bed of a towing vehicle.

A gooseneck coupler may be utilized with a towed vehicle having a gooseneck coupler that may generally be coupled to a hitch ball that may be located in the bed of the towing vehicle. The hitch ball may be permanently or removably secured to the frame or bed of the towing vehicle. The towed vehicle coupler may utilize ball socket coupling mechanism that may be sized and shaped to receive the hitch ball. The ball socket coupling mechanism on the towed vehicle may mount over the hitch ball, which may allow for the towed vehicle to pivot behind the towing vehicle.

More specifically, the gooseneck coupler may engage the hitch ball to pivotally couple the towed vehicle to the towing vehicle. The gooseneck coupler to hitch ball connection may allow for relative movement between the towing vehicle and the towed vehicle as the towing vehicle makes turns, traverses uneven or rough terrain, and passes along inclining and declining roadways. The hitch ball member may be removed or lowered to a stowed position below the bed to ensure that the use of the bed is not substantially hindered by the presence of the ball.

Many gooseneck coupler assemblies require attachment to the towed vehicle through welding at least a portion of the gooseneck coupler assembly to the towed vehicle. Welding the gooseneck coupler assembly to the towed vehicle, however, can prove to be difficult and time consuming. Specifically, portions of the towed vehicle or portions of an attachment device may need to be coped so as to appropriately engage the gooseneck coupler assembly. This is especially the case when the towed vehicle is being attached to a tubular portion of the gooseneck coupler assembly. In this situation, portions of the towed vehicle or an attachment portion may need to be coped to appropriately attach to the tubular portion of the gooseneck coupler assembly.

Many current gooseneck coupler assemblies utilize telescoping tubes, i.e., a first member nested within a second member where the second member circumscribes the first member (tube within a tube), which may result in a gooseneck coupler assembly that is generally symmetrical. The telescoping tubes, however, may result in the gooseneck coupler assembly rattling during operation as the tubes will engage each other during operation. Further, the forces applied to gooseneck coupler assembly during operation are not generally symmetrically applied. The generally symmetrical shape of the gooseneck coupler assembly may require that additional structure be added to portions of the gooseneck coupler assembly that do not need such to operate. Moreover, once a gooseneck coupler is attached to a towed vehicle, to remove such it often requires cutting and/or welding of the trailer frame. Accordingly, there is a need for an improved gooseneck coupler assembly that may reasonably remedy any of the above-identified issues.

SUMMARY

A gooseneck coupler is shown and described. The gooseneck coupler may include a hitch ball attachment member selectively securable to a hitch ball of a towing vehicle, and a support member attached to the hitch ball attachment member, the support member including first and second ends. The gooseneck coupler may also include a trailer attachment member configured to secure a portion of a towed vehicle thereto, the trailer attachment member positionable on the support member between the first and second ends of the support member, where the support member is free of a telescoping relation with the trailer attachment member.

A gooseneck coupler may include a hitch ball attachment member configured to be selectively secured to a hitch ball positioned on a load bed of a towing vehicle, and a coupler body attached to the hitch ball attachment member, the coupler body configured to attach to a portion of a towed vehicle, where the coupler body is non-symmetrical.

A gooseneck coupler may include a hitch ball attachment member configured to be selectively secured to a hitch ball of a towing vehicle, and a support member attached to and extending from the hitch ball attachment member. The gooseneck coupler may also include a trailer attachment member selectively secured to the support member, the trailer attachment member attachable to a portion of the towed vehicle, where the support member is asymmetrical.

BRIEF DESCRIPTION OF THE DRAWINGS

The invention may be better understood by reference to the following detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Figure 1:
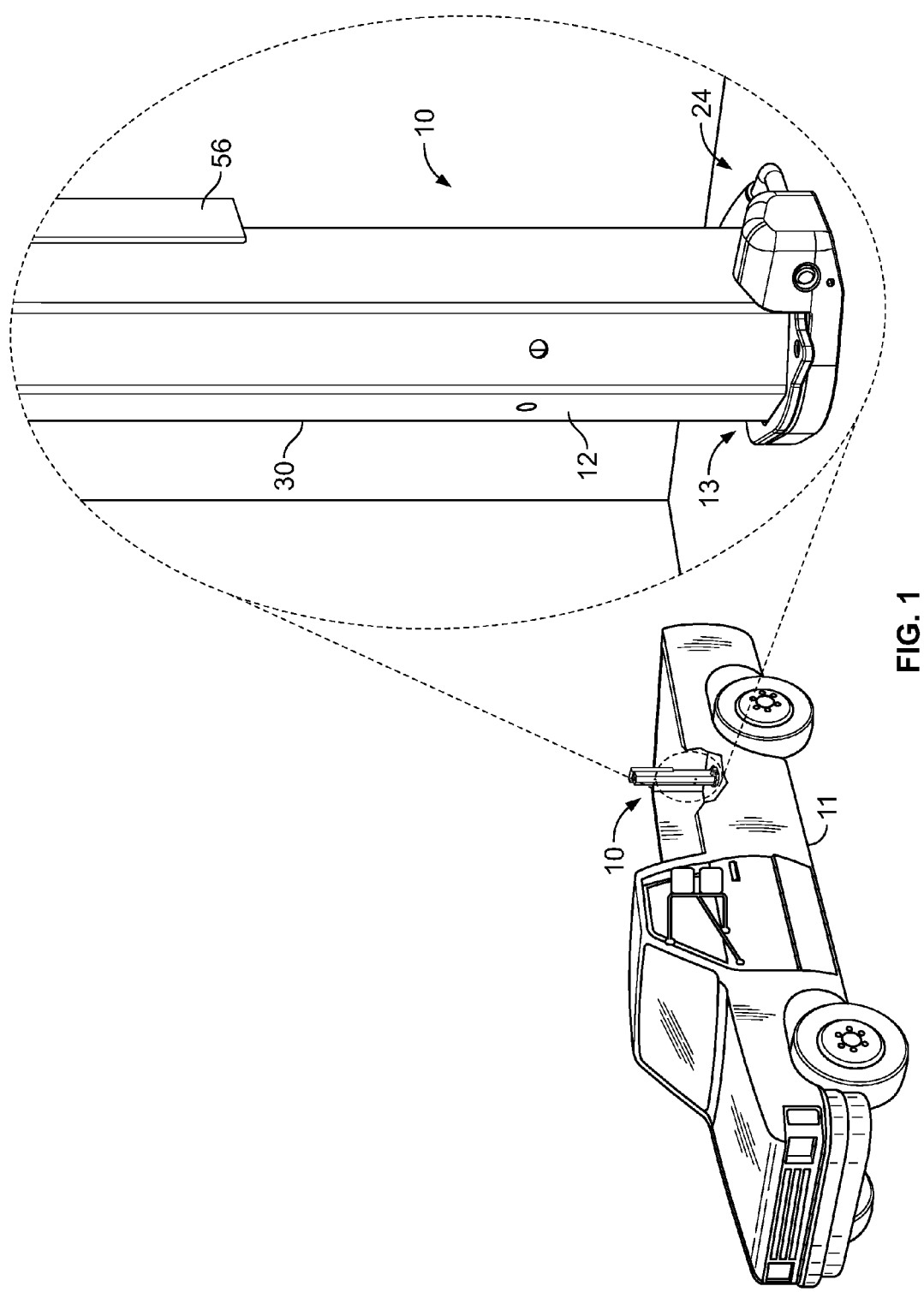
FIG. 1 is a perspective view of some embodiments of a gooseneck coupler in a non-limiting example attached to a towing vehicle.

A gooseneck coupler 10 is illustrated in FIGS. 1-6 and 8. The gooseneck coupler 10 may be configured to be secured to a towed vehicle, such as a trailer (not shown) and to engage a towing vehicle 11, such as a pick-up truck, as shown in FIG. 1. The gooseneck coupler 10 may be of any appropriate shape, size, type or configuration. The gooseneck coupler 10 may include a coupler body 12, a hitch ball attachment member 13 and a locking mechanism 24.

Figure 2:
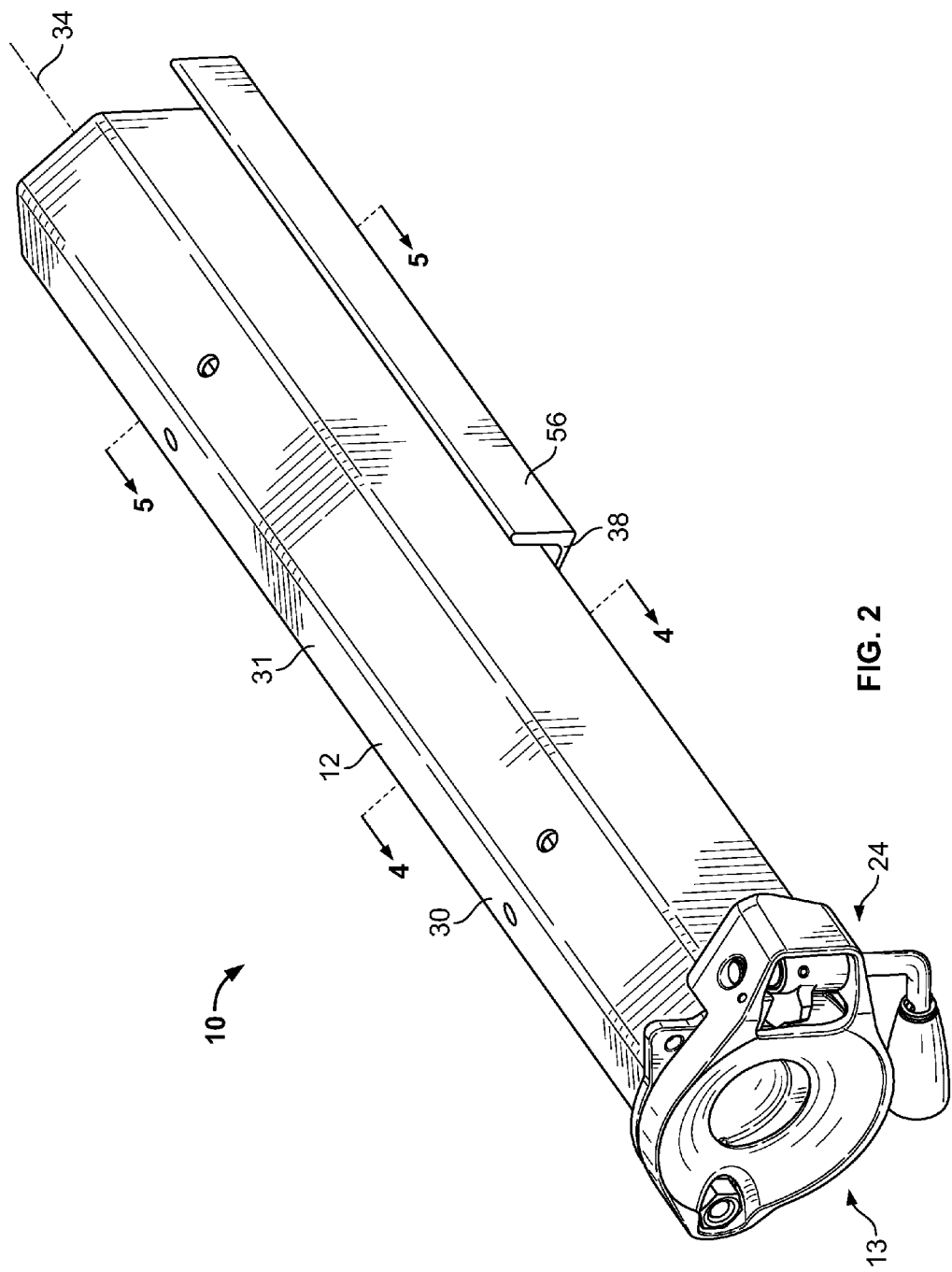
FIG. 2 is a perspective view of the gooseneck coupler of FIG. 1.
Figure 3:
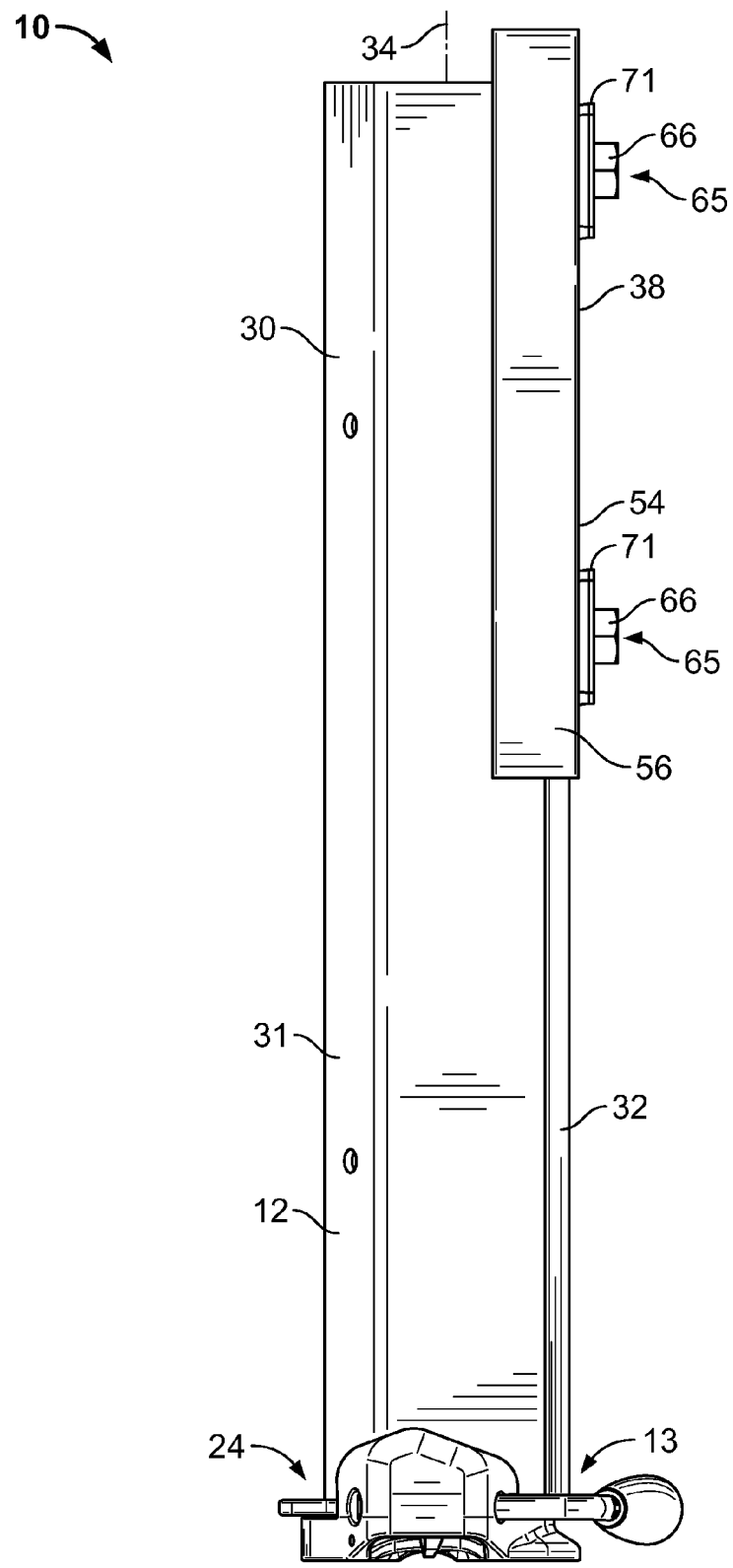
FIG. 3 is a perspective view of the gooseneck coupler of FIG. 1 extending generally vertically.

The coupler body 12 may be attached to the hitch ball attachment member 13 in any appropriate manner. The coupler body 12 may include a generally vertically extending support member 30 that may be attached to the hitch ball attachment member 13 in any appropriate manner. By way of a non-liming example, the support member 30 may welded, fastened, adhered, or the like to the hitch ball attachment member 13. The support member 30 may extend along an axis 34, as shown in FIGS. 2 and 3. The support member 30 may be of any appropriate shape and size. By way of a non-limiting example, the support member 30 may be of a generally hollow tubular member, an I-beam member, a C-channel member, a solid member and the like. Moreover, the support member 30 may be of any appropriate cross-sectional shape, including, without limitation, being of a generally asymmetrical cross-sectional shape. By way of a non-limiting example, the support member may have a cross-sectional shape that is generally pentagonal, circular, rectangular, square, C-shaped, I shaped, U-shaped, D-shaped or any other suitable shape.

In some embodiments, such as that shown in FIGS. 1-6, the support member 30 may have a generally pentagonal cross-sectional shape. In some embodiments, the cross-sectional shape may be generally asymmetrical. The asymmetrical cross-sectional shape may permit more material to be provided in the appropriate position, which may provide additional support for the coupler body 12. By way of a non-limiting example, the shape of the support member 30 may permit more material to be positioned generally fore to aft relative to a location of attachment of a portion of the towed vehicle to the coupler body 12 as opposed to laterally. In some embodiments, the generally pentagonal cross-sectional shape results in greater material being positioned fore to aft relative to the location of attachment of the portion of the towed vehicle to the support member 30. Further, the asymmetrical cross-sectional shape may permit less material to be positioned laterally relative to the location of attachment of the towed vehicle to the coupler body 12. Having less material laterally may allow the gooseneck coupler 10 to be of less weight while retaining the at least the same strength as prior art gooseneck couplers.

Figure 4:
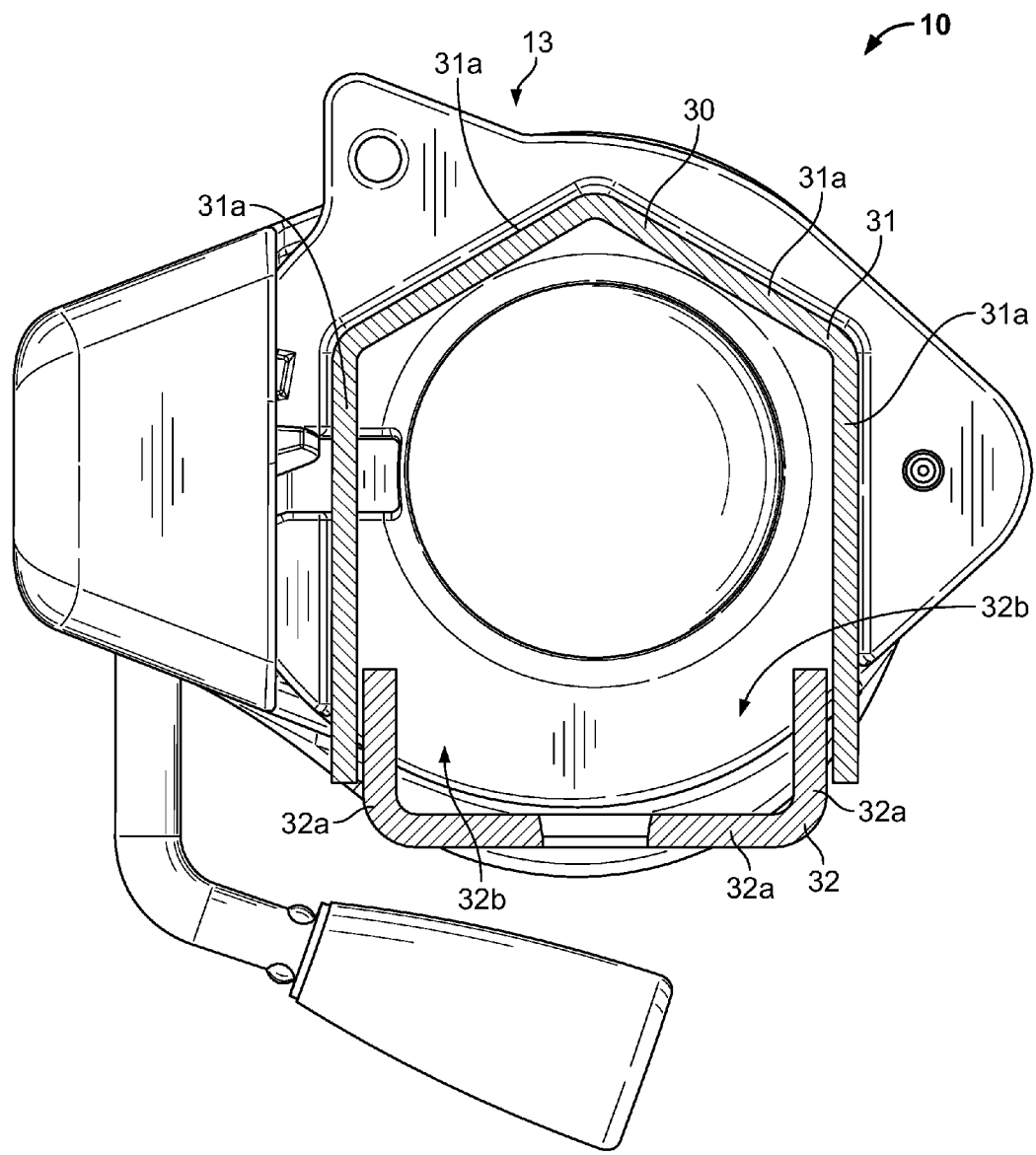
FIG. 4 is a cross-sectional view of the gooseneck coupler of FIG. 2 taken along line 4-4.
Figure 5:
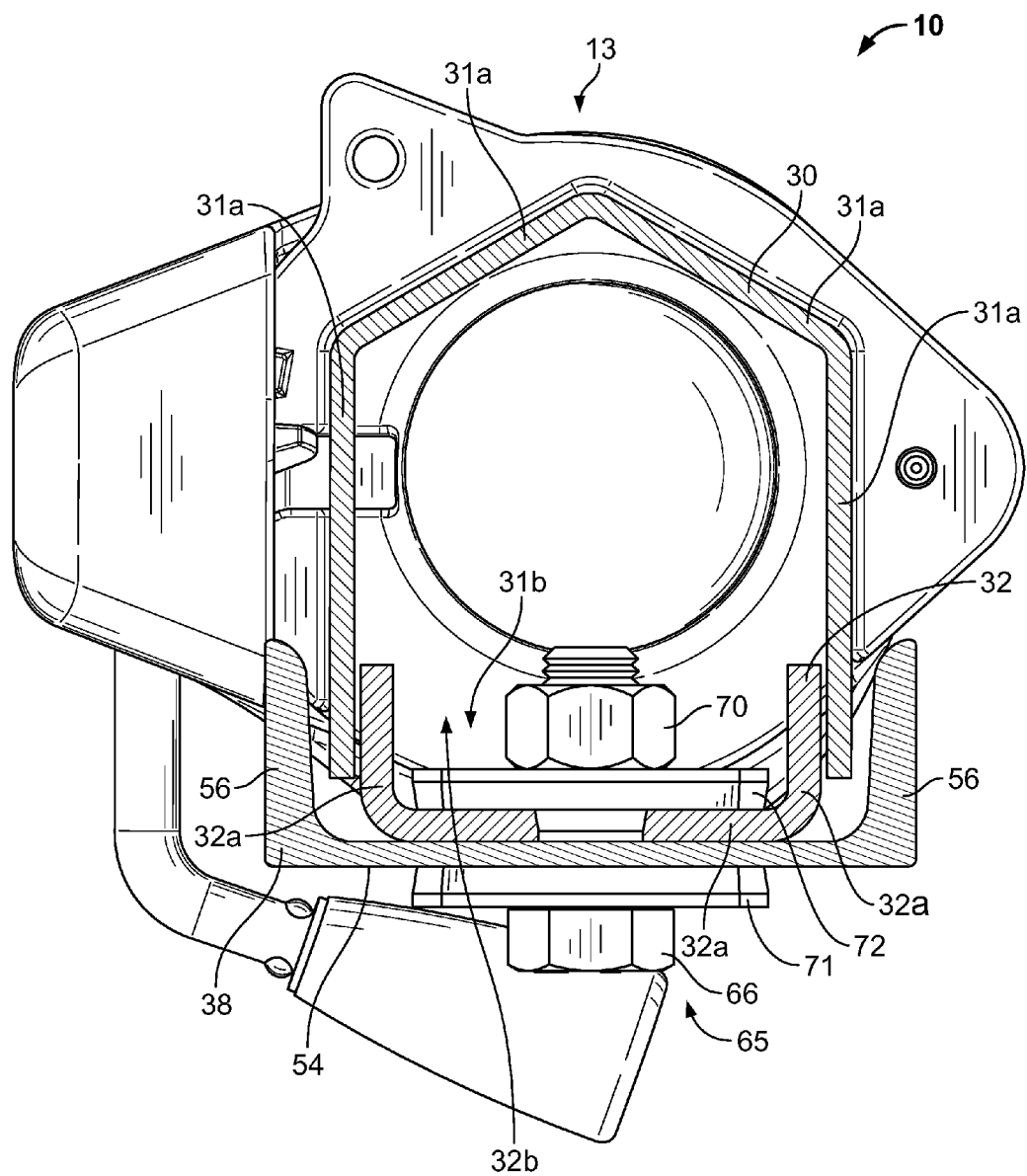
FIG. 5 is a cross-sectional view of the gooseneck coupler of FIG. 2 taken along line 5-5.

Further, in some embodiments, such as shown by way of a non-limiting example in FIGS. 4 and 5, the support member 30 may be formed from a first member or coupler housing 31 and a second member or adjustable channel member 32 that may be attached together in any appropriate manner, such as by way of a non-limiting example, through welding, fastening, adhering or the like. For example, the coupler housing 31 may include four enclosed sides 31a with one open side 31b, which may have a generally V-shaped cross-sectional shape. The adjustable channel member 32 may have three enclosed sides 32a with one open side 32b, which may have a generally C-shaped cross-sectional shape. The adjustable channel member 32 may be secured to the coupler housing 31 at the open sides 31b, 32b. This may form the generally pentagonal cross-sectional shape of the support member 30. In some embodiments, the support member 30 may be integrally formed of a single member that includes an appropriate cross-sectional shape, i.e., the coupler housing 31 and the adjustable channel member 32 may be integrally formed. Further still, the dimensions of at least the coupler housing 31 may be altered to provide additional rigidity and strength to the support member 30. By way of a non-limiting example, the length of the sides 31a may be increased to increase the rigidity and strength of the support member 30. Similarly, the length of the sides 31b may be increased to increase the strength and rigidity of the support member 30.

Figure 6:
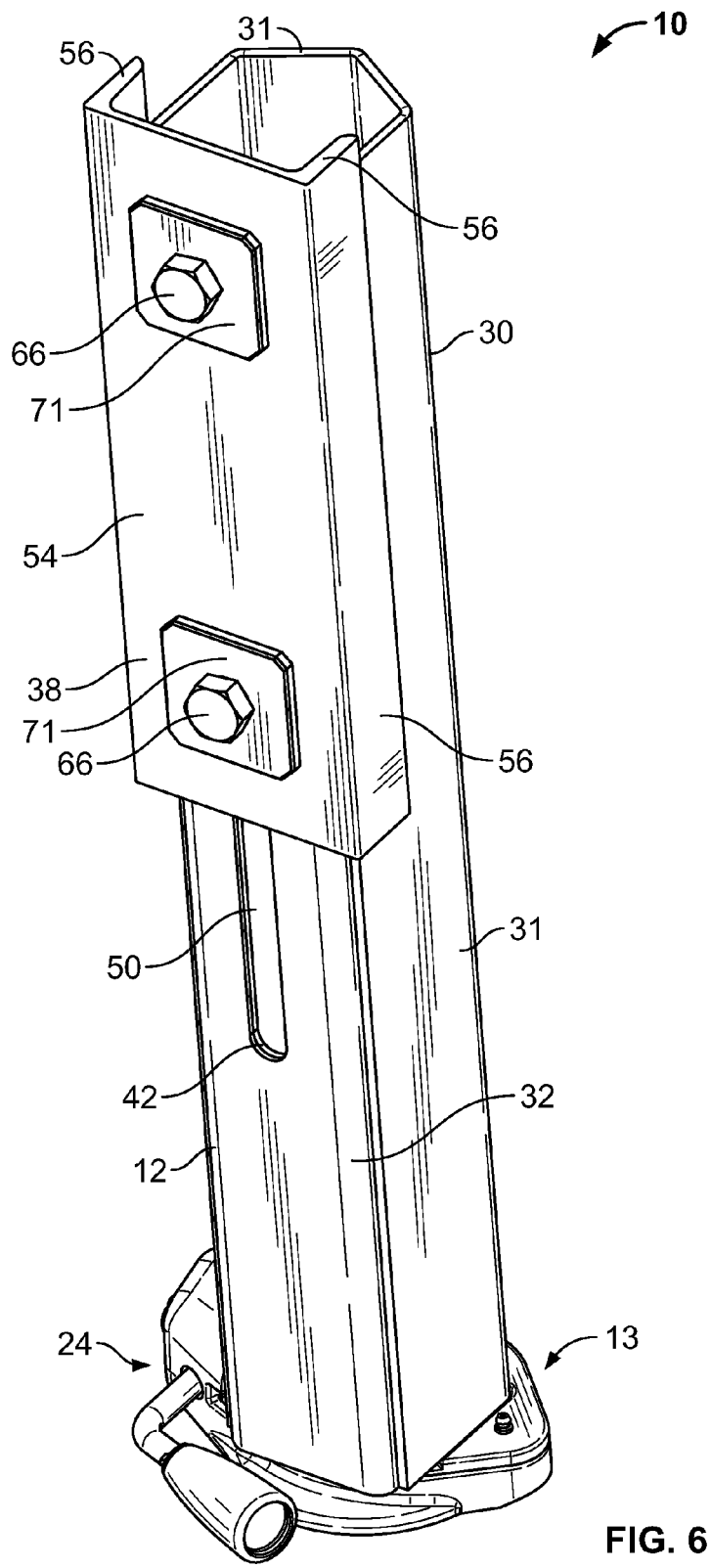
FIG. 6 is a perspective view of the gooseneck coupler of FIG. 1.

The coupler body 12 may include a trailer attachment member 38 that may be selectively and adjustably attached to the support member 30 in any appropriate manner. In some embodiments, the support member 30 may include first and second end portions 40, 42, respectively. The trailer attachment member 38 may be positioned at any position between the first and second end portions 40, 42 of the support member 30, i.e., at an infinite number of positions between the first and second end portions 40, 42. The trailer attachment member 38 may be capable of being selectively positioned along the axis 34 at any position between the first and second end portions 40, 42 in any appropriate manner. In some embodiments, the support member 30 may include a positioning member 50 that may extend along the axis 34 generally between the first and second end portions 40, 42 or otherwise along a portion of the length of the support member 30. In some embodiments, the trailer attachment member 38 may be selectively positionable at any point along the positioning member 50. The positioning member 50 may permit the trailer attachment member 38 to be selectively positioned along the length of the support member 30. By way of a non-limiting example, the positioning member 50 may include a slot, such as shown in FIG. 6. While a slot 50 is shown, any appropriate positioning member may be used, such as for example, a plurality of apertures extending along at least the length of the support member, a groove, a female member, or a male member extending generally laterally from the support member. Moreover, the trailer attachment member 38 maybe adjustably secured to the support member 30 through friction fit—such as described below—or any other appropriate method.

The trailer attachment member 38 may include a generally planar portion 54. The generally planar portion 54 may be generally flat or smooth to provide an appropriate surface to which the towed vehicle may attach. In some embodiments, the generally planar portion 54 may comprise the entire attachment member 38. In other embodiments, only a portion of the trailer attachment member 38 may include the generally planar portion 54. In some embodiments, a remaining portion of the trailer attachment member 38 may include winged members 56 that may extend generally perpendicularly from the generally planar member 54 toward the support member 30. The winged members 56 may provide additional support for the gooseneck coupler 10. Specifically, the winged members 56 may provide additional material in the fore-aft direction to provide additional support fore and aft. The winged members 56 may be integrally formed with the generally planar portion 54, such as casting or bending, or may be attached through a subsequent operation. Moreover, the winged members 56 may provide lateral support to the gooseneck coupler 10, or more particularly to the trailer attachment member 38. Further, the winged members 56 may "stiffen" or reinforce the planar member 54, which may generally provide additional support to the planar member 54, especially during operation of the gooseneck coupler 10.

Figure 7:
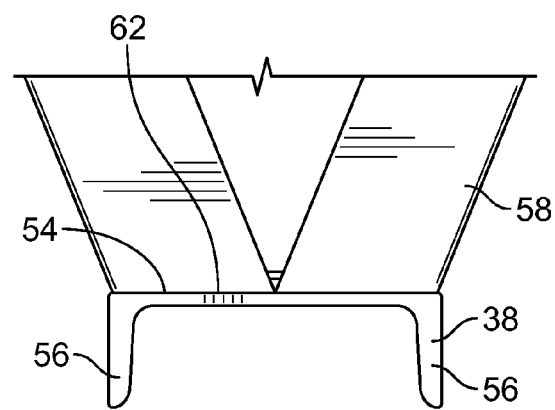
FIG. 7 is a plan view of a portion of a frame of towed vehicle attached to a portion of a gooseneck coupler.
Figure 8:
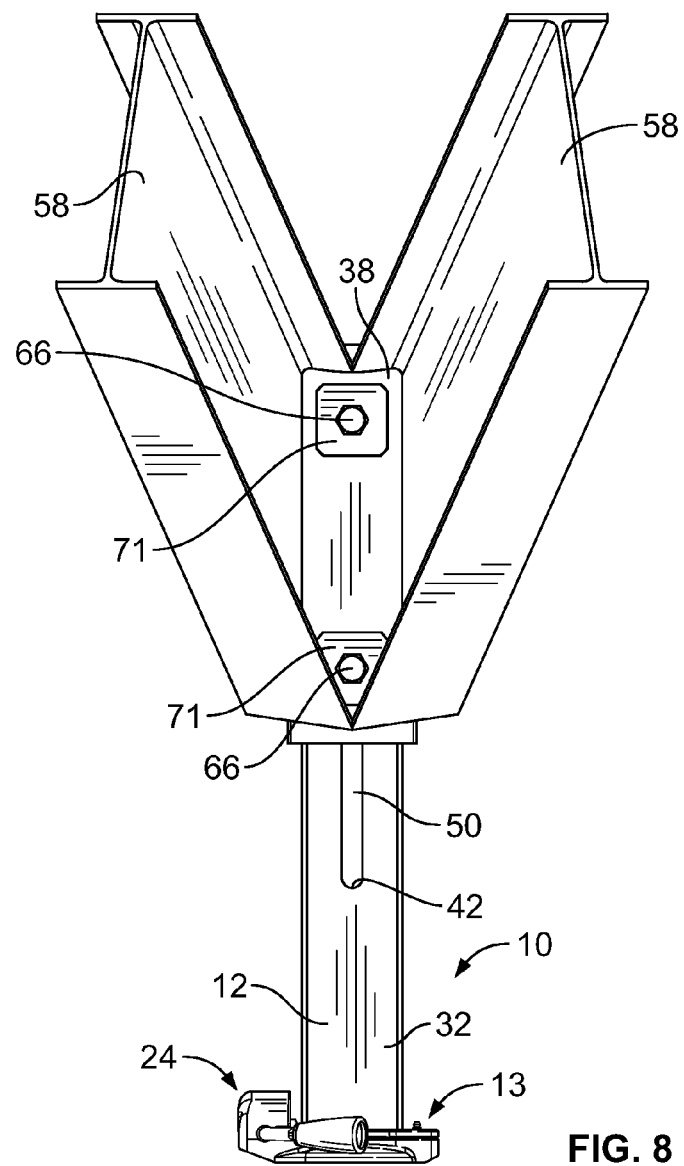
FIG. 8 is a rear view of a portion of a frame of a towed vehicle attached to a gooseneck coupler.

A portion of the towed vehicle, such as by way of a non-limiting example, the trailer frame 58, may be secured with the trailer attachment member 38 such that the frame 58 is generally flush with the trailer attachment member 38. An example of which is shown in FIGS. 7-8. The frame 58 may be secured with the trailer attachment member 38 in any appropriate manner. In some embodiments, the frame 58 may be welded to the trailer attachment member 38. In some embodiments, the frame 58 may include a generally flat end 62 that may be capable of being welded generally flush to the generally planar portion 54 of the trailer attachment member 38. The flat end 62 of the frame 58 may be positioned generally parallel with the generally planar portion 54 and then may be weld thereto. This may permit more material of the frame 58 to remain in order to be attached to the support member 30.

In other embodiments, the frame 58 may be selectively secured to the trailer attachment member 38. In some embodiments, the generally flat end 62 of the frame 58 may be capable of generally engaging flush with the trailer attachment member 38, or more specifically, with the generally planar portion 54 of the trailer attachment member 38. The flat end 62 of the frame 58 may be positioned generally parallel with the generally planar portion 54 and may be fastened thereto. This may permit more material of the frame 58 to remain in order to be attached to the support member 30 as opposed to other prior art gooseneck couplers that may require coping to be secured to the outer tube of the telescoping tubes of the gooseneck coupler. In addition, the generally flat end 62 of the frame 58 may be formed using a machine cut as opposed to hand guided cutting torches used in coping. The engagement of the flat end 62 with the generally planar portion 54 of the trailer attachment member 38 may yield a more controlled fit therebetween. This controlled fit may generally prevent gaps, especially those gooseneck couplers utilizing telescoping tubes, which may prevent rattling during operation. Still further, the engagement of the flat end 62 with the generally planar portion 54 of the trailer attachment member 38 may yield a good weld therebetween.

Further, in some embodiments, a fastening device 65, such as a clamp bolt 66, or more specifically a pair of clamp bolts 66 as best seen in FIGS. 2, 5 and 6 may be selectively attached to the frame 58 and the trailer attachment member 38. This may allow the coupler body 12 to be replaced without any cutting or welding of the frame 58. In some embodiments, portions of the clamp bolts 66 may be positioned within and generally held within the slot 50. Another portion of the clamp bolts 66 may extend outward from the slots 50. The clamp bolts 66 may generally engage the support member 30. Further, the clamp bolts 66 may generally engage the frame 58 positioned adjacent to the frame attachment member 38, which may selectively attach the frame 58 of the towed vehicle to the support member 30. The fastening device 65 may further include nuts 70, which may selectively engage the clamp bolts 66 that may selectively secure the frame 58 and the trailer attachment member 38 to the support 30. Further a washer or plate member 71 may be positioned generally between the clamp bolts 66 and the trailer attachment member 38, such as best shown in FIG. 6. Still further, the fastening device 65 may include an anti-rotation member 72, as best seen in FIG. 5. The anti-rotation member 72 may include an acircular washer or plate that may be engaged with the clamp bolts 66 between the second member 32 and the nut 70. The anti-rotation member 72 may generally prevent the nut 70 from rotating during installation, which may generally not require grasping either of the nut 70 with an additional tool or set of hands during installation. While clamp bolts 66 and nuts 70 are shown, the present teachings are not limited to such. Any appropriate fastening device 65 may be used.

In some embodiments, the clamp bolts 66 may be positioned within the slots 50 such that they may be selectively positioned, such as through sliding along the axis 34, without being removed from the slot 50. This may make securing the frame 58 to the coupler body 12 easier for the operator. The operator may position, such as through sliding, the clamp bolts 66 to the appropriate position. The operator may then selectively engage the trailer attachment member 38 to the clamp bolts 66. Next, the operator may selectively engage the frame 58 with the clamp bolts 66. The nuts 70 may then be engaged with the clamp bolts 66. The frame 58 may then be selectively secured with the support member 30 through the trailer attachment member 38.

Figure 28:
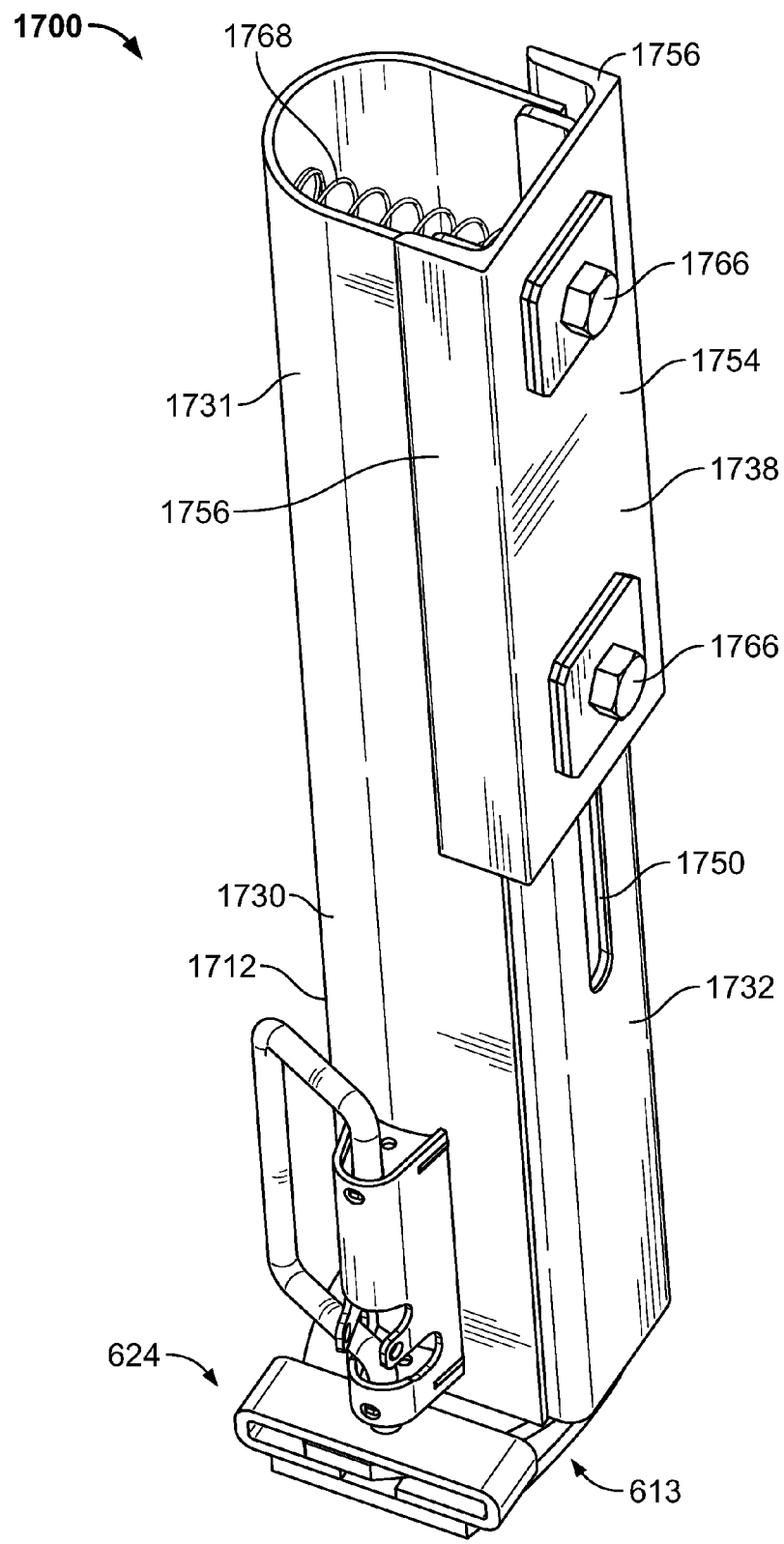
FIG. 28 is a perspective view of other embodiments of a gooseneck coupler.

The fastening device 65 may include an installation aid, such as by way of a non-limiting example a spring 1768, as shown in FIG. 28. The spring 1768 may engage the nut 70. In some embodiments, the nut 70 may be welded to the anti-rotation member 72, such as the square washer shown that may be located and positioned within the support member 30. The square washer 72 may resist any tightening torque while the installation aid may help with positioning of the fastening device 65, or more specifically the clamp bolt 66. The installation aid 1768 may generally hold the fastening device 65, or more specifically the clamp bolt 66, at a selected position during engagement of the clamp bolts 66 with the support member 30 and/or the frame 58 of the towed vehicle and the trailer attachment member 38. By way of a non-limiting example, the installation aid 1768 may generally retain the clamp bolts 66 within the slot 50. The installation aid 1768 may be of any appropriate construction, not just that shown and described in FIG. 28. By way of a non-limiting example, the installation aid may include disposable, temporary, single use, multiple use or furnished device.

Figure 9:
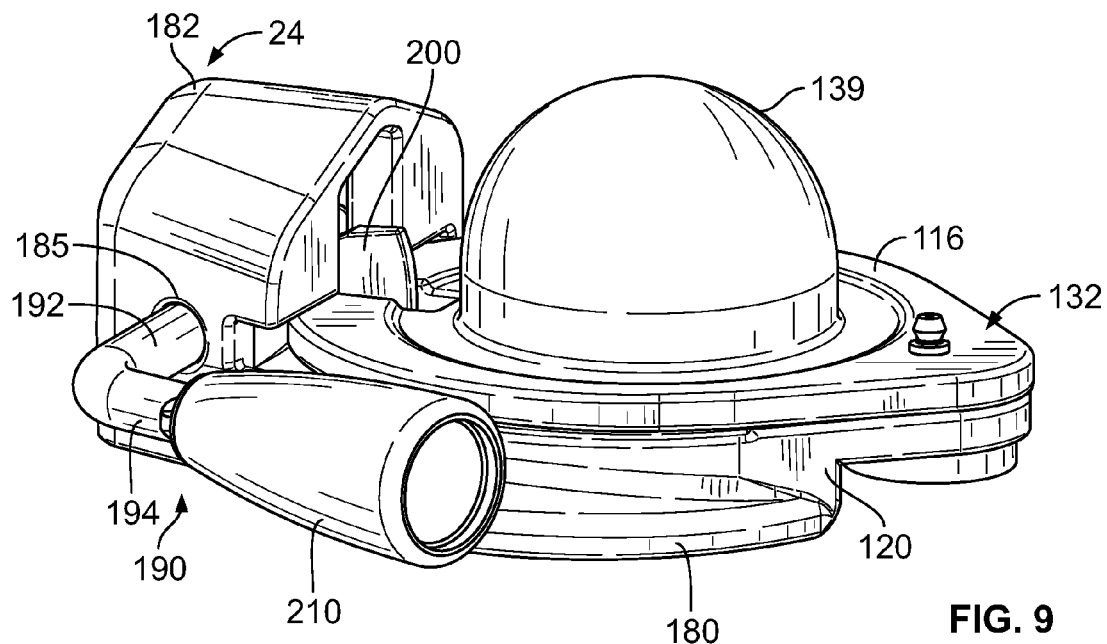
FIG. 9 is a perspective view of a portion of the gooseneck coupler of FIG. 1 in a locked position.
Figure 10:
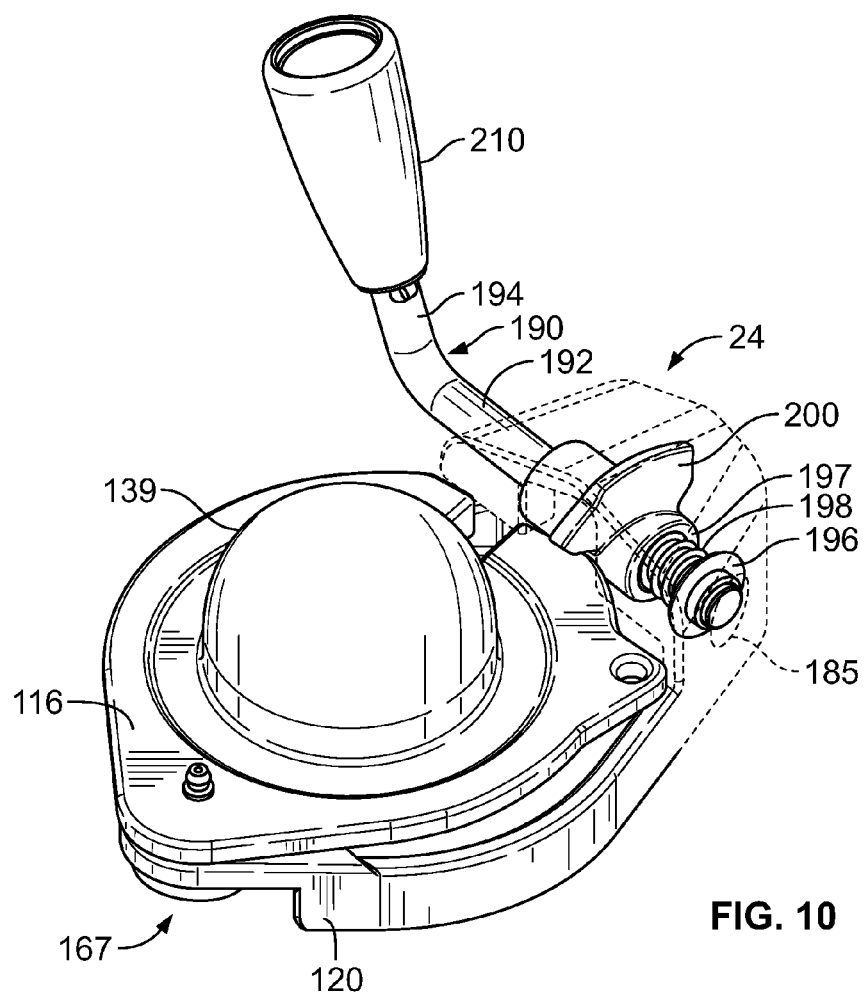
FIG. 10 is a perspective view of a portion of the gooseneck coupler of FIG. 1 in an unlocked position.
Figure 11:
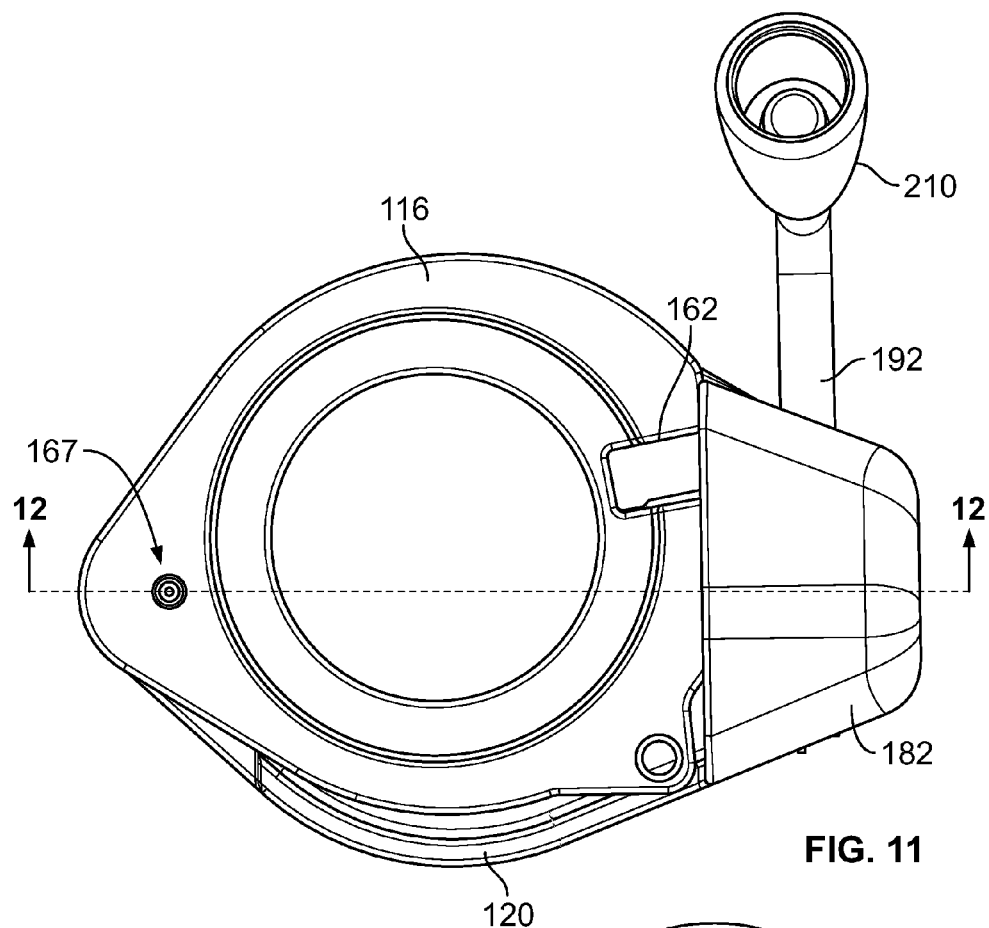
FIG. 11 is a top view of a portion of the gooseneck coupler of FIG. 10.

In some embodiments, the hitch ball attachment member 13 and locking mechanism 24 may be as described and shown in U.S. application Ser. Nos. 13/299,453 and 13/299,424, both of which were filed on Nov. 18, 2011 and both of which are incorporated herein by reference. By way of a non-limiting example, the attachment member 13 may include a base plate 116 and a locking plate 120. The base plate 116 may be of any appropriate shape, size, type or configuration, such as of a generally ovular configuration as shown in FIGS. 9-11, or a generally rectangular configuration. The base plate 116 may have an upper surface 132 and a lower surface 133. In the exemplary embodiment shown, the coupler body 12, or more specifically, the support member 30, is attached to the upper surface 132 of the base plate 116. Additionally, the base plate 116 may include a pivotal male extension 137 to pivotally attach the locking plate 120 with the base plate 116. In an exemplary embodiment, the pivotal male extension 137 may be integrally formed with the base plate 116. More specifically, the locking plate 120 may include an aperture 138 shaped and sized to receive the pivotal male extension 137 therein to pivotally attach the locking plate 120 and the base plate 116. In some embodiments however, pivotal male extension 137 may be a component separate from base plate 116, such as a pivot pin or the like.

The base plate 116 may further include an opening 141. The opening 141 may be of any appropriate shape, size, type or configuration, such as a generally circular shape. The opening 141 may be located at any appropriate position on the base plate 116, such as at an approximate central location on the base plate 116 as shown in the exemplary embodiment. The base plate 116 may further include a socket 139 that may be positioned directly over the opening 141 such that the opening 141 may provide access to the socket 139.

The socket 139 may be of any appropriate shape, size, type or configuration, such as of a generally semi-spherical shape as shown in the exemplary embodiment of FIGS. 7, 8 and 10. For example, the socket 139 may be of a shape and size to receive a hitch ball 142, which may be attached to a towing vehicle in a conventional manner, within the socket 139. The socket 139 may be located at any appropriate position, such as adjacent the opening 141 of the base plate 116. The socket 139 may be secured to the base plate 116 by any appropriate means, such as by welding, or the like. While the base plate 116 and socket 139 may be shown as separate components, it is to be understood that the base plate 116 and socket 139 may be fabricated as a single integral piece and should not be limited to that shown or described herein.

The base plate 116 may include a slot 162. The slot 162 may be positioned in proximity to the locking mechanism 24 such that when the gooseneck coupler 10 is in the locked position, the locking mechanism 24 engages the slot 162 as more fully described below. The slot 162 may be integrally formed with the base plate 116 or may be formed therein such as by machining the slot 162 into the base plate 116 after formation of the base plate 116, by way of a non-limiting example.

The locking plate 120 may be of any appropriate shape, size, type or configuration, such as of a generally ovular or rectangular configuration. For example, the locking plate 120 may be of a similar shape and size as that of the base plate 116. The locking plate 120 may be located at any appropriate position on the gooseneck coupler 10, such as adjacent base plate 116. For example, the locking plate 120 may be located in pivoting engagement with the base plate 116 and in particular to the underside 133 of the base plate 116. More specifically, the locking plate 120 may be pivotably connected to the base plate 116 at a pivot 167. The pivot 167 may be located on the base plate 116 and the locking plate 120 as is shown in FIGS. 10 and 11.

Figure 12:
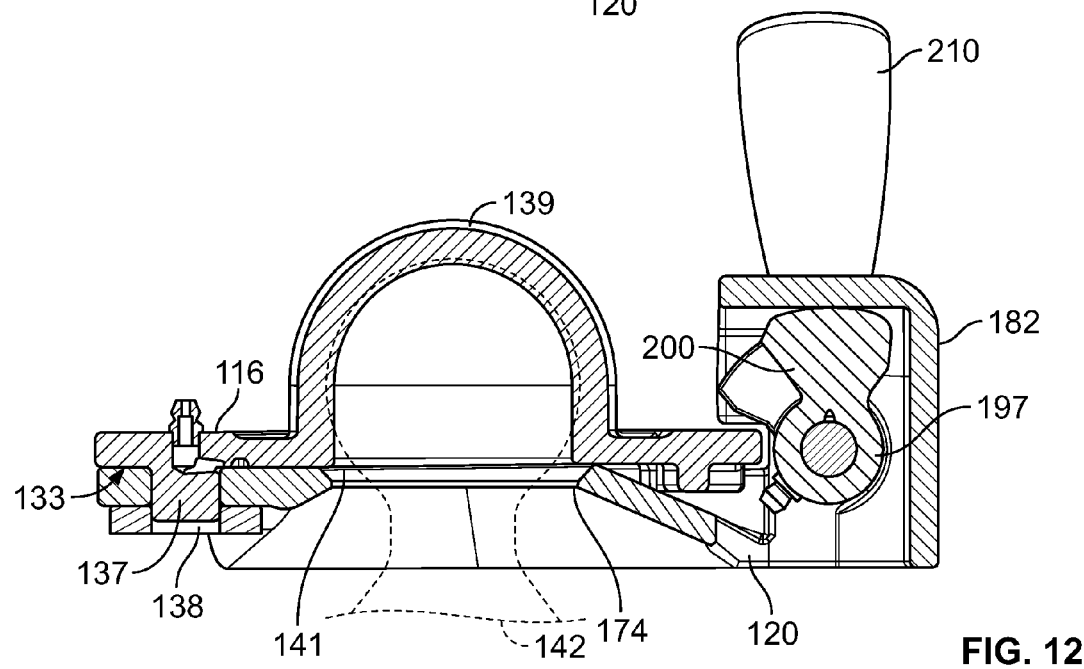
FIG. 12 is a cross-sectional front view taken along line 12-12 of FIG. 11 with a hitch ball in phantom.

The locking plate 120 may include a hitch ball opening 174. The hitch ball opening 174 may be of any appropriate shape, size, type or configuration, such as of a generally circular shape as shown in FIGS. 2 and 12. For example, the hitch ball opening 174 may be of a similar shape and size as that of the opening 141 in the base plate 116. The hitch ball opening 174 may be located at any appropriate position on the locking plate 120, such as at an approximate central location on the locking plate 120, whereby the hitch ball opening 174 may generally align with the opening 141 in the base plate 116 when the base plate 116 and locking plate 120 are pivotably attached and are in the unlocked position.

In some embodiments, the hitch ball opening 174 may be a continuous opening in locking plate 120 (wherein the opening 174 may have a continuous perimeter that defines the opening 174) or a discontinuous opening 174 such as a recess, slot or other surface feature on a perimeter or side of locking plate 120. In some embodiments, locking plate 120 may be generally blade shaped with a surface feature on the periphery, such as a recess, slot or the like, that may generally align with the opening 141 in base plate 116 and may be capable of engaging a portion of the hitch ball 42 when in the locked or engaged position.

This alignment of the opening 141 in the base plate 116 and the hitch ball opening 174 of the locking plate 120 may provide an entrance for the hitch ball 142 to enter into the socket 139 of the base plate 116. The hitch ball 142 of the towing vehicle may generally be located within and abut the socket 139 during engagement of the gooseneck coupler 10 and the towed vehicle.

The locking plate 120 may be of a shape and size to include a symmetric entry distended surface 180. In particular, the distended surface 180 may be shaped so that it extends as a funnel out from the hitch ball opening 174 of the locking plate 120 to create a larger surface, which may make it easier to install the hitch ball 142 through the hitch ball opening 174, through the opening 141, and into the socket 139. For example, when the gooseneck coupler 10 is lowered onto the hitch ball 142 the distended surface 180 may create a large target such that any minor misalignment between the gooseneck coupler 10 and the hitch ball 142 may be substantially corrected. As the gooseneck coupler 10 is lowered onto the hitch ball 142, gravity helps to move the gooseneck coupler 10 into substantial alignment with the hitch ball 142 by riding along the distended surface 180 until the hitch ball 142 enters the opening 174 in the locking plate 120 and the opening 141 in the base plate 116.

The locking mechanism 24 may be attached to the locking plate 120. The locking mechanism 24 may include a body portion 182 that may be attached to the locking plate 120, as shown in FIGS. 7 and 9-10. The body portion 182 may be welded to the locking plate 120 or alternatively, may be integrally formed with the locking plate 120 so that they are formed of one integral piece. The body portion 182 may include at least one aperture 185. Although, in the exemplary embodiment shown, by way of a non-limiting example, two apertures 185 are shown located on opposite sides of the body portion 182.

The locking mechanism 24 may further include a handle 190. The handle 190 may comprise a substantially straight tubular portion 192 and a curved portion 194. The straight portion 192 and the curved portion 194 may be integrally formed together, may be welded together, or otherwise attached using fasteners, or the like. The straight portion 192 may extend through the body portion 182, and in particular, through the apertures 185 such that at least a portion of the straight portion 192 is retained within the body portion 182. At least one bushing 196 may be retained within the apertures 185 in the body portion 182 to help retain the handle 190 within the body portion 182. In particular, a single bushing 196 may be positioned within either one of the apertures 185, or alternatively, a bushing 196 may be positioned in each of the apertures 185.

The locking mechanism 24 may further include a cam 197 and a spring 198. The spring 198 may telescopingly or rotationally engage the handle 190 within the body portion 182 of the locking plate 120. In particular, the spring 198 telescopingly engages the straight portion 192 of the handle 190. In this exemplary embodiment, the spring 198 works as a dual action spring, particularly working in compression and torsion. For example, the torsion of the spring 198 may bias the handle 190 and the cam 197 in the locked position under a predetermined preload based upon the torsional compressibility of the spring 198. The compression of the spring 198 may also help keep the spring 198 and bushing 196 in place on the handle 190. The torsion of the spring 198 may help prevent the handle 190 from rattling within the body portion 182.

As shown in the exemplary embodiment of FIG. 8, the cam 197 may be attached to the handle 190 adjacent the spring 198. In particular, the cam 197 may be secured to the straight portion 192 of the handle 190 and may be positioned between the spring 198 and the body portion 182 in close proximity to one of the apertures 185. By way of a non-limiting example, the cam 197 may be secured to the handle 190 such as by using a fastener, such as a pin mechanism. The cam 197 may be cast, forged, or the like. The cam 197 may include a blade 200 that may be attached by welding, integrally forming it with the cam 197, or the like. In a non-limiting example, the blade 200 may be shaped, sized and positioned on the cam 197 to create a substantially helix like structure.

The curved handle portion 194 includes a gripping portion 210. The gripping portion 210 may be made of a material such as plastic, rubber, or any such similar material. The gripping portion 210 may be of an ergonomically beneficial shape such that it may make gripping the handle 190 easier. The gripping portion 210 may be attached to the handle 190 as through fasteners, adhesives or the like or may be integrally formed with the handle 190.

In operation, the gooseneck coupler 10 is capable of engaging the hitch ball 142 attached to the towing vehicle such that the towing vehicle may tow the towed vehicle. More specifically, the gooseneck coupler 10 may be positioned over the hitch ball 142 on the towing vehicle. The locking mechanism 24 is put in the unlocked position and the locking plate 120 is lined up with the base plate 116. The hitch ball 142 is then positioned through the hitch ball opening 174 in the locking plate 120 and through the opening 141 in the base plate 116 until the hitch ball 142 rests within the socket 139. Then the locking plate 120 may be pivoted against the hitch ball 142 to wedgingly engage the locking plate 120 with the hitch ball 142. The handle 190 may be used to help pivot the locking plate 120.

The locking mechanism 24 may then be engaged to the locking position to lock the gooseneck coupler 10 to the hitch ball 142. The locking mechanism 24 may be rotated from the unlocked position to the locked position. By way of a non-limiting example, to lock the locking mechanism 24 the handle 190, and in particular, the gripping portion 210, may be rotated counter-clockwise by a user. As the handle 190 is rotated counter-clockwise the blade 200 rotates in a substantially helical path and begins to engage the slot 162 of the base plate 116, which wedgingly engages the locking plate 120 to the hitch ball 142. The more the handle 190 is rotated counter-clockwise the more the blade 200 engages the slot 162 of the base plate 116. More specifically, the blade 200 moves helically toward the slot 162 of the base plate 116. As the blade 200 engages the slot 162 of the base plate 116, the locking plate 120 may be pivoted relative to the base plate 116 at the pivot 167. The more the locking plate 120 pivots relative to the base plate 116 the more the locking plate 120 engages the hitch ball 142 further securing the gooseneck 10 to the hitch ball 142. The relative rotation between base plate 116 and locking plate 120 causes openings 141, 174 to become misaligned and secures the hitch ball 142 within socket 139.

The blade 200 further may create a hard stop when it is fully engaged with the slot 162 of the base plate 116. This may prevent further rotation of the handle 190 beyond the locked position. More specifically, when the handle 190 is in the fully locked position, the blade 200 may rest on top of the base plate 116, which may prevent further rotation of the handle 190. When in the locked position, the handle 190 may be in an approximate coplanar position relative to the base plate 116. When handle 190 is in the unlocked position, the handle 190 may be in a substantially vertical position relative to the base plate 116 and more specifically is disengaged from the slot 162 of the base plate 116.

The structure of the exemplary embodiment of the locking mechanism 24 permits an operator to use the handle 190 to lock the gooseneck coupler 10. In operation, the operator may only need to use the handle 190 to move the locking plate 120 to pivot relative to the base plate 116 to lock the gooseneck coupler 10 in place.

Further, the generally flat end 62 of the frame 58 being capable of generally engaging flush with the trailer attachment member 38, or more specifically, with the generally planar portion 54 of the trailer attachment member 38 may result in a planar mounted gooseneck coupler 10 with the frame 58 of the towed vehicle. Also, the gooseneck coupler 10 may be capable of engaging the frame 58 of the towed vehicle at various heights. In some embodiments, the range of applicable heights may be selective positions or in other embodiments, the range of applicable heights may be any position—in infinite number of positions—between two predetermined locations or ends of the support member 30.

Additional embodiments of a gooseneck coupler according the present teachings are described below. In the descriptions, all of the details and components may not be fully described or shown. Rather, the features or components are described and, in some instances, differences with the above-described embodiments may be pointed out. Moreover, it should be appreciated that these additional embodiments may include elements or components utilized in the above-described embodiments although not shown or described. Thus, the descriptions of these additional embodiments are merely exemplary and not all-inclusive nor exclusive. Moreover, it should be appreciated that the features, components, elements and functionalities of the various embodiments may be combined or altered to achieve a desired gooseneck coupler without departing from the spirit and scope of the present teachings.

Figure 13:
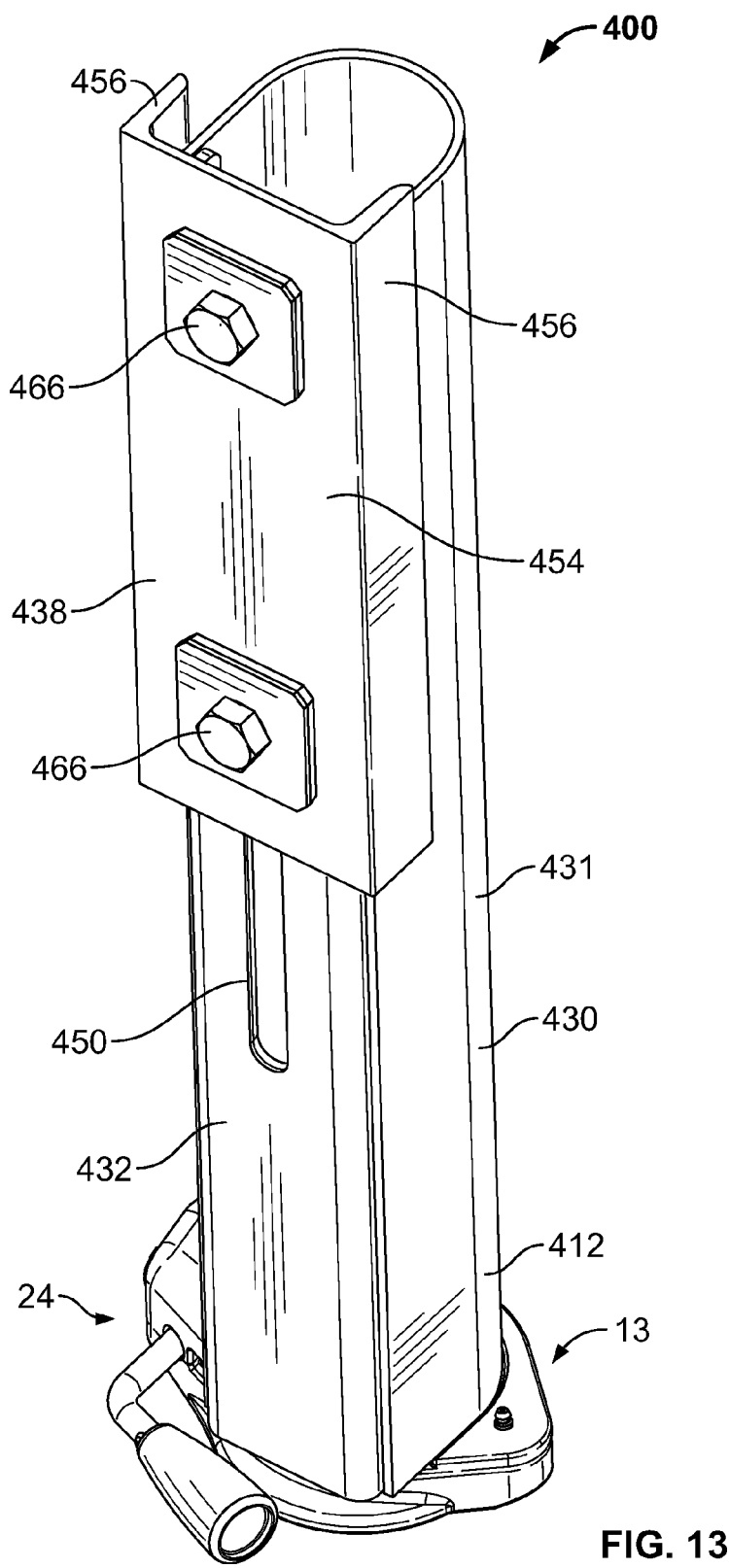
FIG. 13 is a perspective view of other embodiments of a gooseneck coupler.

In some embodiments, such as that shown in FIG. 13, a gooseneck coupler 400 may include a coupler body 412, a hitch ball attachment member 13 and a locking mechanism 24. The coupler body 412 may include a support member 430 that may be of a generally D-shaped cross-sectional shape. This may result in the cross-sectional shape being generally asymmetrical. The support member 430 may be formed from a first member or coupler housing 431 and a second member or adjustable channel member 432 that may be attached together in any appropriate manner. For example, the first member 431 may have a generally semi-circular or oval cross-sectional shape. The second member 432 may have a generally C-shaped cross-sectional shape. The second member 432 may be secured to the first member 431 forming the D-cross-sectional shape of the support member 430.

The coupler body 412 may include a trailer attachment member 438 that may be selectively and adjustably attached to the support member 430 in any appropriate manner. By way of a non-limiting example, the support member 430 may include a positioning member 450. The trailer attachment member 438 may be selectively positionable at any point along the positioning member 450. The positioning member 450 may permit the trailer attachment member 438 to be selectively positioned along a portion of the length of the support member 430.

The trailer attachment member 438 may include a generally planar portion 454 and may include winged members 456 that may extend generally perpendicularly from the generally planar member 454 toward the support member 430. The winged members 456 may provide additional support for the gooseneck coupler 400. The generally planar portion 454 may provide a generally flat surface to which a portion of the towed vehicle may attach, such as the frame 58.

Further, the gooseneck coupler 400 may include at least one fastening device 466, such as the pair of clamp bolts shown in FIG. 13, which may be selectively attached to the towed vehicle, such as the frame 58 and the trailer attachment member 438. This may allow the coupler body 412 to be replaced without any cutting or welding of the frame 58. Portions of the clamp bolts 466 may be positioned within and generally held within the slot 450. Another portion of the clamp bolts 466 may extend outward from the slots 450. The clamp bolts 466 may generally engage the support member 430. Further, the clamp bolts 466 may generally engage the frame 58 positioned adjacent to the frame attachment member 438—or more specifically, the generally planar portion 454. This may selectively attach the frame 58 of the towed vehicle to the support member 430.

Figure 14:
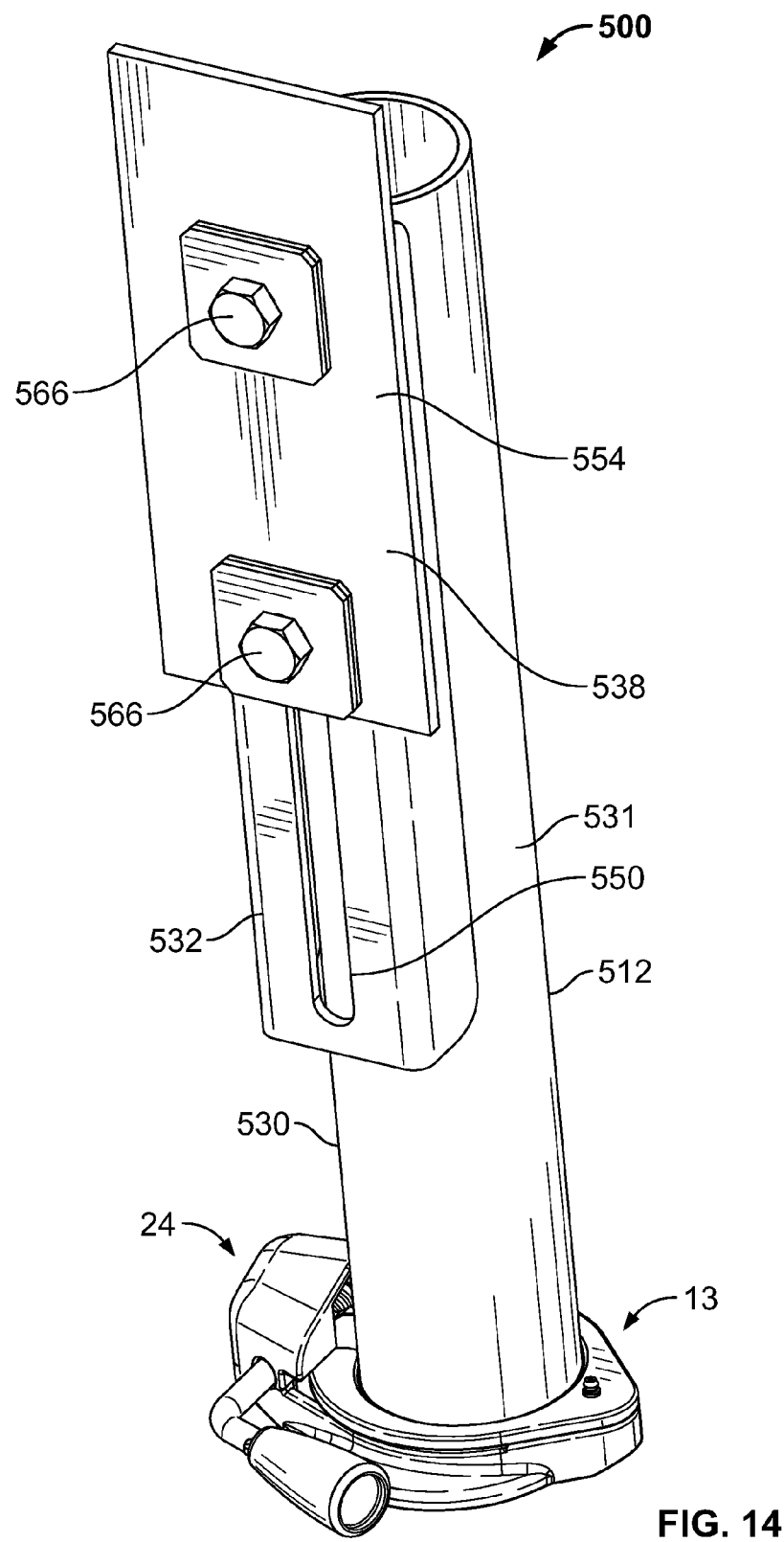
FIG. 14 is a perspective view of other embodiments of a gooseneck coupler.

In some embodiments, such as that shown in FIG. 14, a gooseneck coupler 500 may include a coupler body 512, a hitch ball attachment member 13 and a locking mechanism 24. The coupler body 512 may include a support member 530 that may have a generally asymmetrical cross-sectional shape. The support member 530 may be formed from a first member or coupler housing 531 and a second member or adjustable channel member 532 that may be attached together in any appropriate manner. For example, the first member 531 may have a generally circular cross-sectional shape. The second member 532 may have a generally C-shaped cross-sectional shape. The second member 532 may be secured to the first member 531 forming the asymmetrical cross-sectional shape of the support member 530.

The coupler body 512 may include a trailer attachment member 538 that may be selectively and adjustably attached to the support member 530 in any appropriate manner. By way of a non-limiting example, the second member 532 of the support member 530 may include a positioning member 550. The trailer attachment member 538 may be selectively positionable at any point along the positioning member 550. The positioning member 550 may permit the trailer attachment member 538 to be selectively positioned along a portion of the length of the support member 530.

The trailer attachment member 538 may include a generally planar portion 554. The generally planar portion 454 may provide a generally flat surface to which a portion of the towed vehicle may attach, such as the frame 58. Further, the gooseneck coupler 500 may include at least one fastening device 566, such as the pair of clamp bolts shown in FIG. 14, which may be selectively attached to the towed vehicle, such as the frame 58 and the trailer attachment member 538. This may allow the coupler body 512 to be replaced without any cutting or welding of the frame 58. Portions of the clamp bolts 566 may be positioned within and generally held within the slot 550. Another portion of the clamp bolts 566 may extend outward from the slots 550. The clamp bolts 566 may generally engage the support member 530. Further, the clamp bolts 566 may generally engage the frame 58 positioned adjacent to the frame attachment member 538—or more specifically, the generally planar portion 554. This may selectively attach the frame 58 of the towed vehicle to the support member 530.

Figure 15:
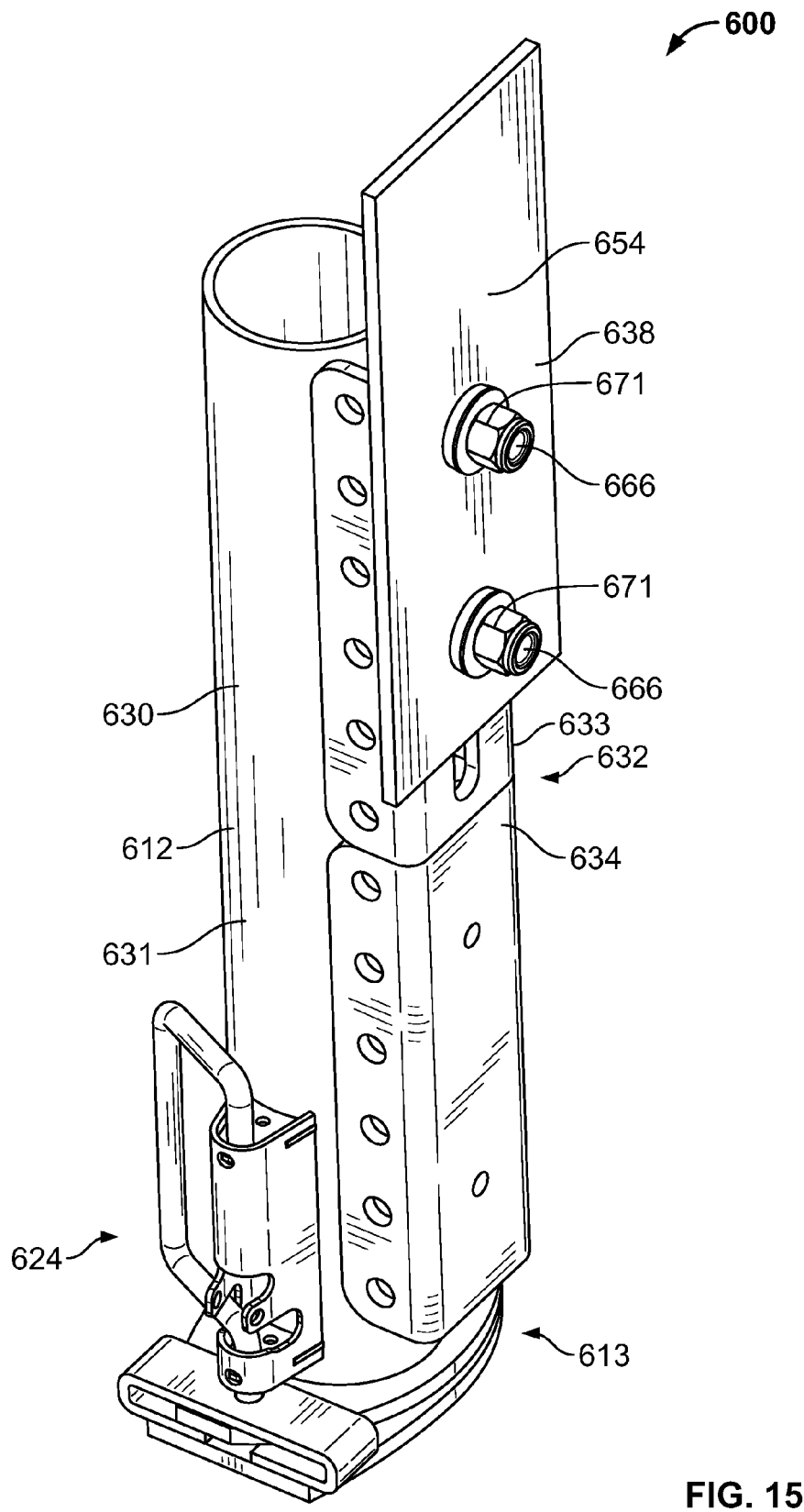
FIG. 15 is a perspective view of other embodiments of a gooseneck coupler with other embodiments of a hitch ball attachment member.

In some embodiments shown in FIG. 15, a gooseneck coupler 600 may include a coupler body 612, a hitch ball attachment member 613 and a locking mechanism. In some embodiments, the hitch ball attachment member 613 and locking mechanism 624 may be as shown and disclosed in U.S. Patent Application No. 20030047908, and U.S. application Ser. No. 12/971,960 filed Dec. 17, 2010—both of which are hereby incorporated by reference—or may be a combination of such. The present teachings are not limited to the hitch ball attachment member 13 or 613 or the locking mechanism 24 or 624. Any appropriate such hitch ball attachment member and/or locking mechanism may be used without departing from the present teachings. Moreover, in those embodiments shown with the hitch ball attachment member 13 may alternatively utilize the hitch ball attachment member 613 and vice verse—those embodiments shown the with the hitch ball attachment member 613 may alternatively utilize the hitch ball attachment member 13. Similarly, in those embodiments shown with the locking mechanism 24 may alternatively utilize the locking mechanism 624 and vice verse—those embodiments shown with the locking mechanism 624 may alternatively utilize the locking mechanism 24. Still further, those embodiments utilizing the hitch ball attachment member 13 may alternatively utilize the locking mechanism 624, and those embodiments utilizing the hitch ball member 613 may alternatively utilize the locking mechanism 24.

The coupler body 612 may include a support member 630 that may have a generally asymmetrical cross-sectional shape. The support member 630 may be formed from a first member or coupler housing 631 and a second member or adjustable channel member 632 that may be attached together in any appropriate manner. For example, the first member 631 may have a generally circular cross-sectional shape. The second member 632 may have a generally C-shaped cross-sectional shape and may include an upper portion 633 and a lower portion 634, which may be attached together or may be formed from an integral single member. The second member 632 may be secured to the first member 631, or more specifically, the upper portion 633 and lower portion 634 may be attached to the first member 631, forming the asymmetrical cross-sectional shape of the support member 630.

The coupler body 612 may include a trailer attachment member 638 that may be selectively and adjustably attached to the support member 630 in any appropriate manner. By way of a non-limiting example, the second member 632—or more specifically, the upper portion 633—of the support member 630 may include a positioning member 650. The trailer attachment member 638 may be selectively positionable at any point along the positioning member 650. The positioning member 650 may permit the trailer attachment member 638 to be selectively positioned along a portion of the length of the support member 630.

The trailer attachment member 638 may include a generally planar portion 654. The generally planar portion 654 may provide a generally flat surface to which a portion of the towed vehicle may attach, such as the frame 58. Further, the gooseneck coupler 600 may include at least one fastening device 666, such as the pair of bolts shown in FIG. 15, which may be selectively attached to the towed vehicle, such as the frame 58 and the trailer attachment member 638. The fastening device 666 may include nuts 671 that may selectively engage the bolts. This may allow the coupler body 612 to be replaced without any cutting or welding of the frame 58. Portions of the bolts 666 may be positioned within and generally held within the slot 650 using the nuts 671. The bolts 666 may generally engage the support member 630. Further, the bolts 666 may generally engage the frame 58 positioned adjacent to the frame attachment member 638— or more specifically, the generally planar portion 654. This may selectively attach the frame 58 of the towed vehicle to the support member 630.

Figure 16:
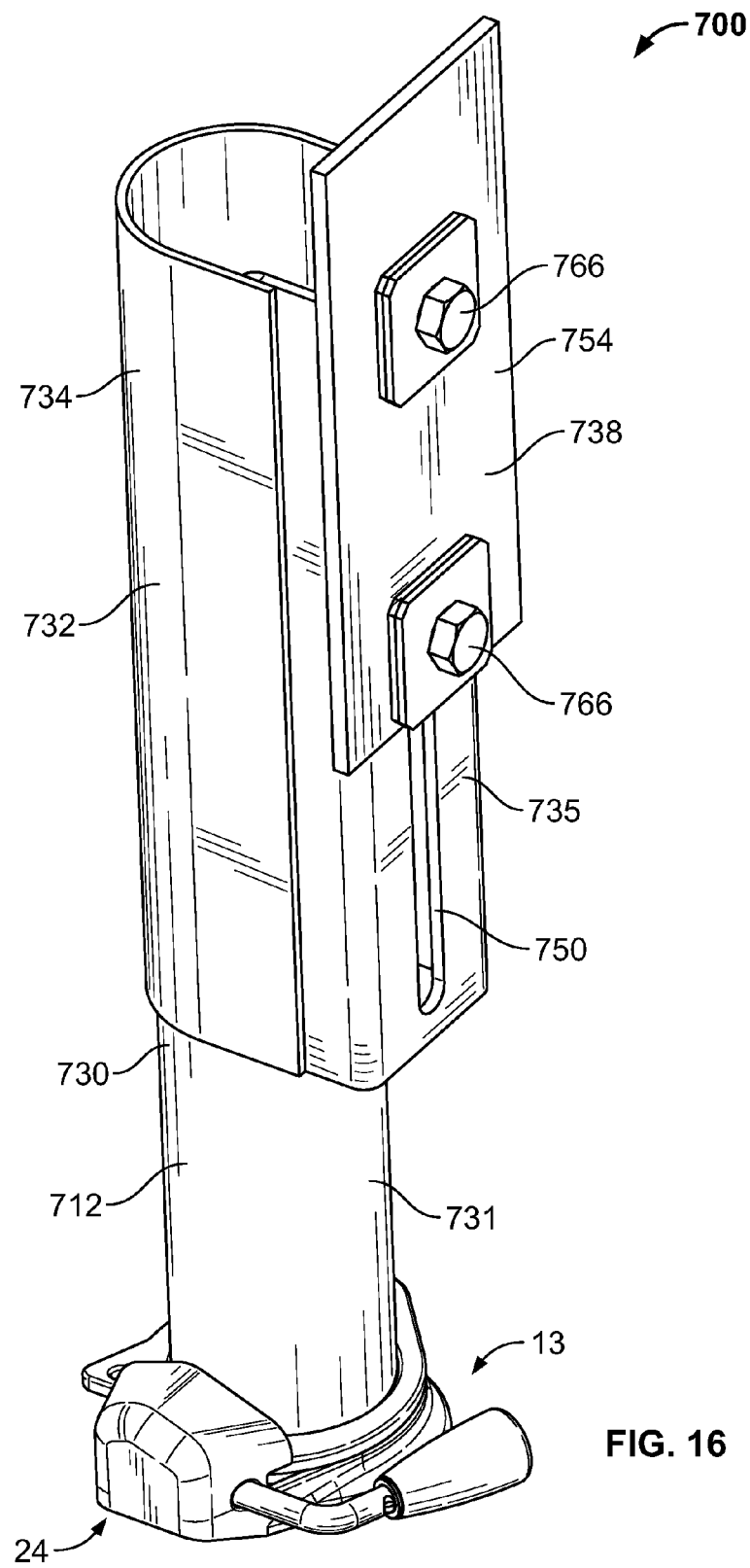
FIG. 16 is a perspective view of other embodiments of a gooseneck coupler.

In the embodiments shown in FIG. 16, a gooseneck coupler 700 may include a coupler body 712, a hitch ball attachment member 13 and a locking mechanism 24. The coupler body 712 may include a support member 730 that may have a generally asymmetrical cross-sectional shape. The support member 730 may be formed from a first member or coupler housing 731 and a second member or adjustable channel member 732 that may be attached together in any appropriate manner. For example, the first member 731 may have a generally circular cross-sectional shape. The second member 732 may have a generally D-shaped cross-sectional shape. The second member 732 may be secured to the first member 731 forming the asymmetrical cross-sectional shape of the support member 730. Further, the second member 732 may be formed from a partial tubular member 734 that may have a generally C-shaped cross-sectional shape and a generally C-shaped plate member 735. The tubular member 734 may be attached to the C-shaped plate member 735 in any appropriate manner to form the second member 732. In some embodiments, the second member 732 may be selectively positionable on the first member 731.

The coupler body 712 may include a trailer attachment member 738 that may be selectively and adjustably attached to the support member 730 in any appropriate manner. By way of a non-limiting example, the second member 732 of the support member 730, or more specifically, the plate member 735, may include a positioning member 750. The trailer attachment member 738 may be selectively positionable at any point along the positioning member 750. The positioning member 750 may permit the trailer attachment member 738 to be selectively positioned along a portion of the length of the support member 730.

The trailer attachment member 738 may include a generally planar portion 754. The generally planar portion 754 may provide a generally flat surface to which a portion of the towed vehicle may attach, such as the frame 58. Further, the gooseneck coupler 700 may include at least one fastening device 766, such as the pair of clamp bolts shown in FIG. 16, which may be selectively attached to the towed vehicle, such as the frame 58 and the trailer attachment member 738. This may allow the coupler body 712 to be replaced without any cutting or welding of the frame 58. Portions of the clamp bolts 766 may be positioned within and generally held within the slot 750. Another portion of the clamp bolts 766 may extend outward from the slots 750. The clamp bolts 766 may generally engage the support member 730. Further, the clamp bolts 766 may generally engage the frame 58 positioned adjacent to the frame attachment member 738—or more specifically, the generally planar portion 754. This may selectively attach the frame 58 of the towed vehicle to the support member 730.

Figure 17:
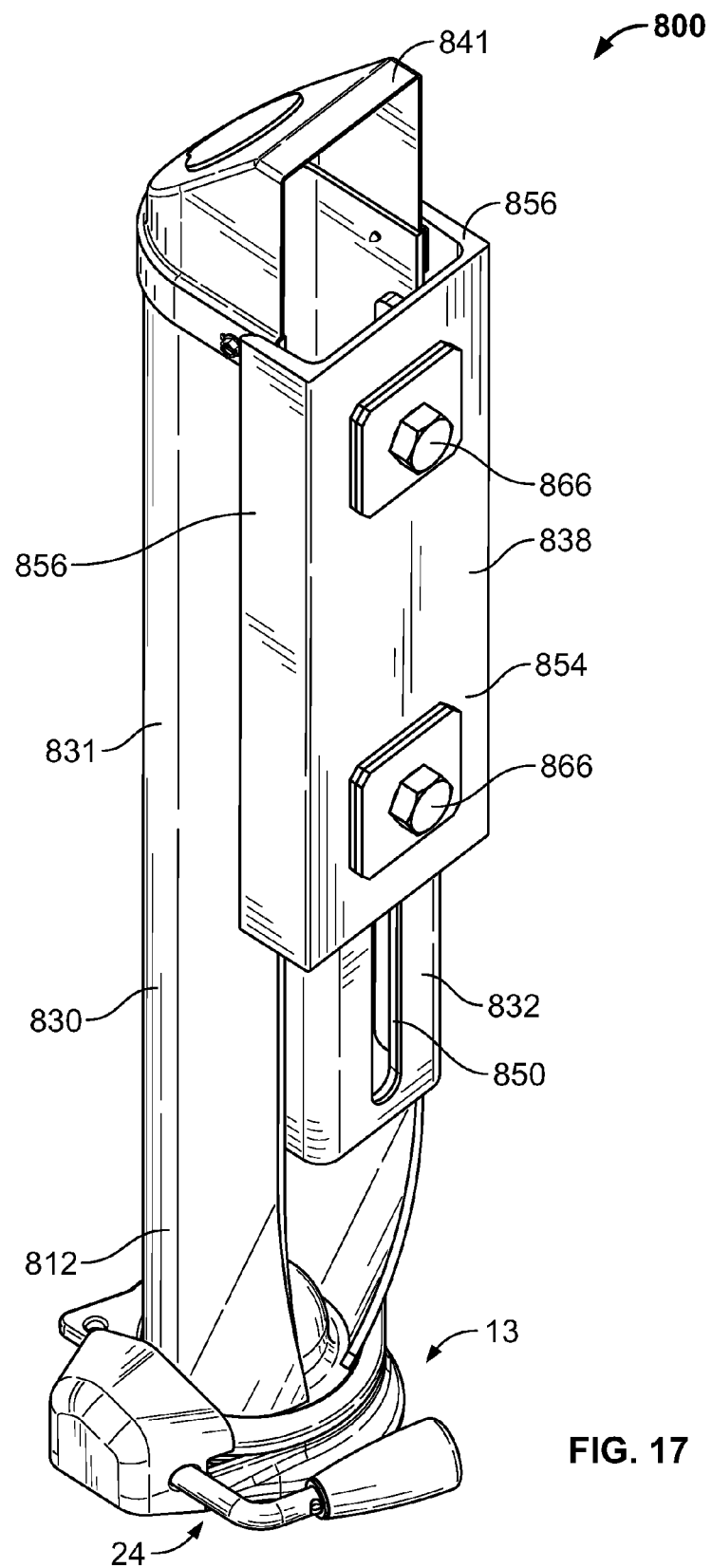
FIG. 17 is a perspective view of other embodiments of a gooseneck coupler.

In the embodiments shown in FIG. 17, a gooseneck coupler 800 may include a coupler body 812, a hitch ball attachment member 13 and a locking mechanism 24. The coupler body 812 may include a support member 830 that may have a generally asymmetrical cross-sectional shape. The support member 830 may be formed from a first member or coupler housing 831 and a second member or adjustable channel member 832 that may be attached together in any appropriate manner. For example, the first member 831 may have a generally semi-circular cross-sectional shape. The second member 832 may have a generally C-shaped cross-sectional shape. The second member 832 may be secured to the first member 831 forming the asymmetrical cross-sectional shape of the support member 830. Further, an end cap 841 may be attached to the support member 830. By way of a non-limiting example, the end cap 841 may be secured to the first member 831 in any appropriate manner, such as by the use of fasteners or the like. In some embodiment, the end cap 841 may be removably secured to the support member 830, which may permit access to the interior of the support member 830, such as to secure the first and second members 831, 832, to access the fastening devices 866 mentioned below, or for any other appropriate need.

The coupler body 812 may include a trailer attachment member 838 that may be selectively and adjustably attached to the support member 830 in any appropriate manner. By way of a non-limiting example, the second member 832 of the support member 830 may include a positioning member 850. The trailer attachment member 838 may be selectively positionable at any point along the positioning member 850. The positioning member 850 may permit the trailer attachment member 838 to be selectively positioned along a portion of the length of the support member 830.

The trailer attachment member 838 may include a generally planar portion 854. The generally planar portion 854 may provide a generally flat surface to which a portion of the towed vehicle may attach, such as the frame 58. The trailer attachment member 838 may include winged members 56 that may extend generally perpendicularly from the generally planar member 854 toward the support member 30. The winged members 856 may provide additional support for the gooseneck coupler 800. Specifically, the winged members 856 may provide additional material in the fore-aft direction to provide additional support fore and aft. The winged members 856 may be integrally formed with the generally planar portion 854, such as casting or bending, or may be attached through a subsequent operation.

Further, the gooseneck coupler 800 may include at least one fastening device 866, such as the pair of clamp bolts shown in FIG. 17, which may be selectively attached to the towed vehicle, such as the frame 58 and the trailer attachment member 838. This may allow the coupler body 812 to be replaced without any cutting or welding of the frame 58. Portions of the clamp bolts 866 may be positioned within and generally held within the slot 850. Another portion of the clamp bolts 866 may extend outward from the slots 850. The clamp bolts 866 may generally engage the support member 830. Further, the clamp bolts 866 may generally engage the frame 58 positioned adjacent to the frame attachment member 838—or more specifically, the generally planar portion 854. This may selectively attach the frame 58 of the towed vehicle to the support member 830.

Figure 18:
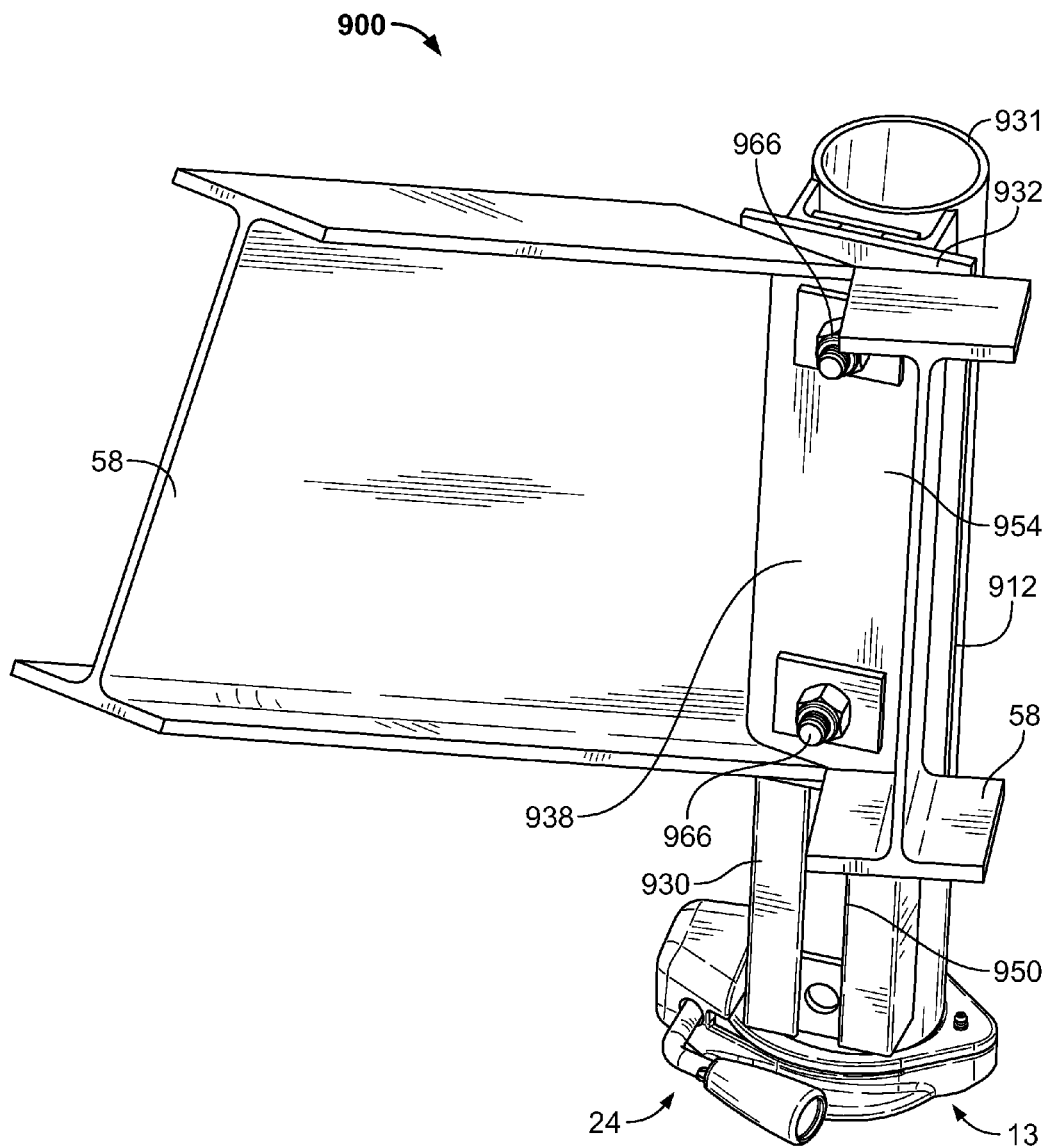
FIG. 18 is a perspective view of other embodiments of a gooseneck coupler with a portion of a towed vehicle attached.

In the embodiments shown in FIG. 18, a gooseneck coupler 900 may include a coupler body 912, a hitch ball attachment member 13 and a locking mechanism 24. The coupler body 912 may include a support member 930 that may have a generally asymmetrical cross-sectional shape. The support member 930 may be formed from a first member or coupler housing 931 and a second member or adjustable channel member 932 that may be attached together in any appropriate manner. For example, the first member 931 may have a generally semi-circular cross-sectional shape. The second member 932 may have a generally C-shaped cross-sectional shape. The second member 932 may be secured to the first member 931 forming the asymmetrical cross-sectional shape of the support member 930. The first and second members 931, 932 may be of generally similar height, but need to be so.

The coupler body 912 may include a trailer attachment member 938 that may be selectively and adjustably attached to the support member 930 in any appropriate manner. By way of a non-limiting example, the second member 932 of the support member 930 may include a positioning member 950. The trailer attachment member 938 may be selectively positionable at any point along the positioning member 950. The positioning member 950 may permit the trailer attachment member 938 to be selectively positioned along a portion of the length of the support member 930.

The trailer attachment member 938 may include a generally planar portion 954. The generally planar portion 954 may provide a generally flat surface to which a portion of the towed vehicle may attach, such as the frame 58. Further, the gooseneck coupler 900 may include at least one fastening device 966, such as the pair of clamp bolts shown in FIG. 18, which may be selectively attached to the frame 58 of the towed vehicle and the trailer attachment member 938. This may allow the coupler body 912 to be replaced without any cutting or welding of the frame 58. The fastening device 966 may generally engage the support member 930. Further, the fastening device 966 may generally engage the frame 58 positioned adjacent to the frame attachment member 938—or more specifically, the generally planar portion 954. This may selectively attach the frame 58 of the towed vehicle to the support member 930.

Figure 19:
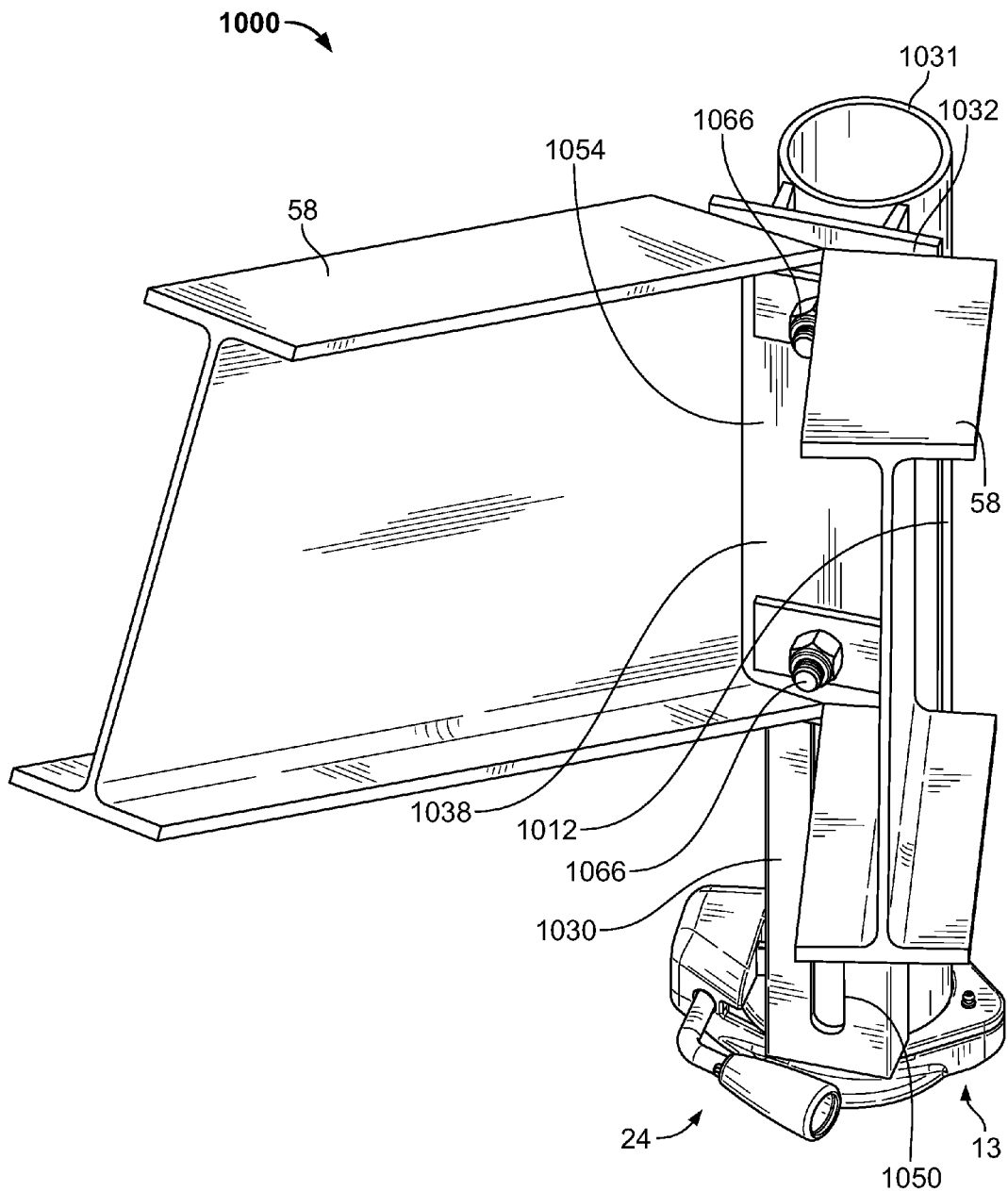
FIG. 19 is a perspective view of other embodiments of a gooseneck coupler with a portion of a towed vehicle attached.

In the embodiments shown in FIG. 19, a gooseneck coupler 1000 may include a coupler body 1012, a hitch ball attachment member 13 and a locking mechanism 24. The coupler body 1012 may include a support member 1030 that may have a generally asymmetrical cross-sectional shape. The support member 1030 may be formed from a first member or coupler housing 1031 and a second member or adjustable channel member 1032 that may be attached together in any appropriate manner. For example, the first member 1031 may have a generally semi-circular cross-sectional shape. The second member 1032 may have a generally Π-shaped cross-sectional shape. The second member 1032 may be secured to the first member 1031 forming the asymmetrical cross-sectional shape of the support member 1030. The first and second members 1031, 1032 may be of generally similar height, but need to be so.

The coupler body 1012 may include a trailer attachment member 1038 that may be selectively and adjustably attached to the support member 1030 in any appropriate manner. By way of a non-limiting example, the second member 1032 of the support member 1030 may include a positioning member 1050. The trailer attachment member 1038 may be selectively positionable at any point along the positioning member 1050. The positioning member 1050 may permit the trailer attachment member 1038 to be selectively positioned along a portion of the length of the support member 1030.

The trailer attachment member 1038 may include a generally planar portion 1054. The generally planar portion 1054 may provide a generally flat surface to which a portion of the towed vehicle may attach, such as the frame 58. Further, the gooseneck coupler 1000 may include at least one fastening device 1066, such as the pair of clamp bolts shown in FIG. 19, which may be selectively attached to the frame 58 of the towed vehicle and the trailer attachment member 1038. This may allow the coupler body 1012 to be replaced without any cutting or welding of the frame 58. The fastening device 1066 may generally engage the support member 1030. Further, the fastening device 1066 may generally engage the frame 58 positioned adjacent to the frame attachment member 1038—or more specifically, the generally planar portion 1054. This may selectively attach the frame 58 of the towed vehicle to the support member 1030.

Figure 20:
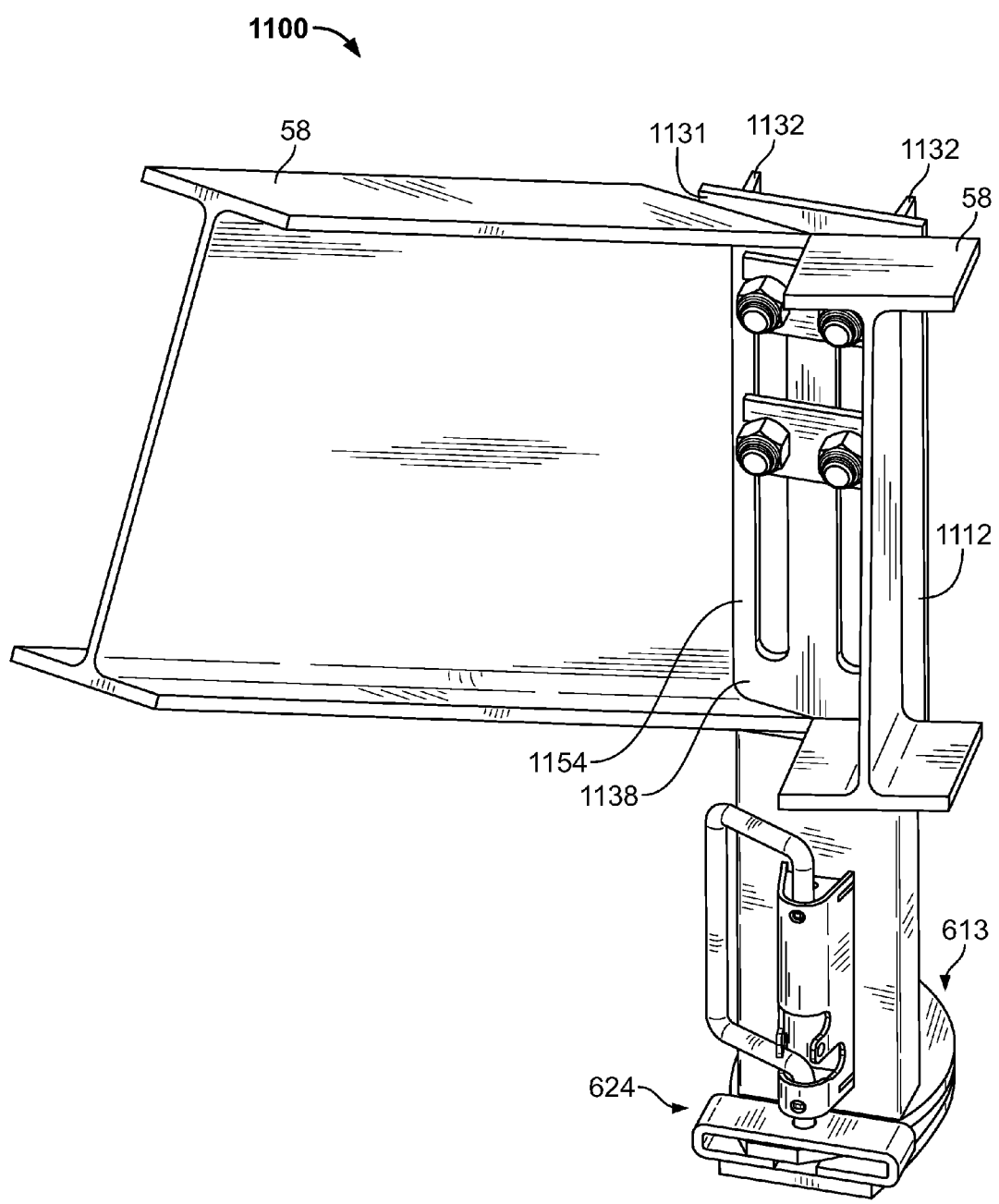
FIG. 20 is a perspective view of other embodiments of a gooseneck coupler with a portion of a towed vehicle attached.

In some embodiments shown in FIG. 20, a gooseneck coupler 1100 may include a coupler body 1112, a hitch ball attachment member 613 and a locking mechanism 624. The coupler body 1112 may include a support member 1130 that may be of a generally C-shaped cross-sectional shape, which may result in a generally asymmetrical cross-sectional shape. The support member 1130 may include a generally flat portion 1131 and rear extending portions 1132. The flat portion 1131 may act as an adjustable channel member and the rear extending portion 1131 as a coupler housing.

The coupler body 1112 may include a trailer attachment member 1138 that may be selectively and adjustably attached to the support member 1130 in any appropriate manner. The trailer attachment member 1138 may include a generally planar portion 1154. The generally planar portion 1154 may provide a generally flat surface to which a portion of the towed vehicle may attach, such as the frame 58. Further, the gooseneck coupler 1100 may include at least one fastening device 1166, such as the two pairs of clamp bolts shown in FIG. 20.

Figure 21:
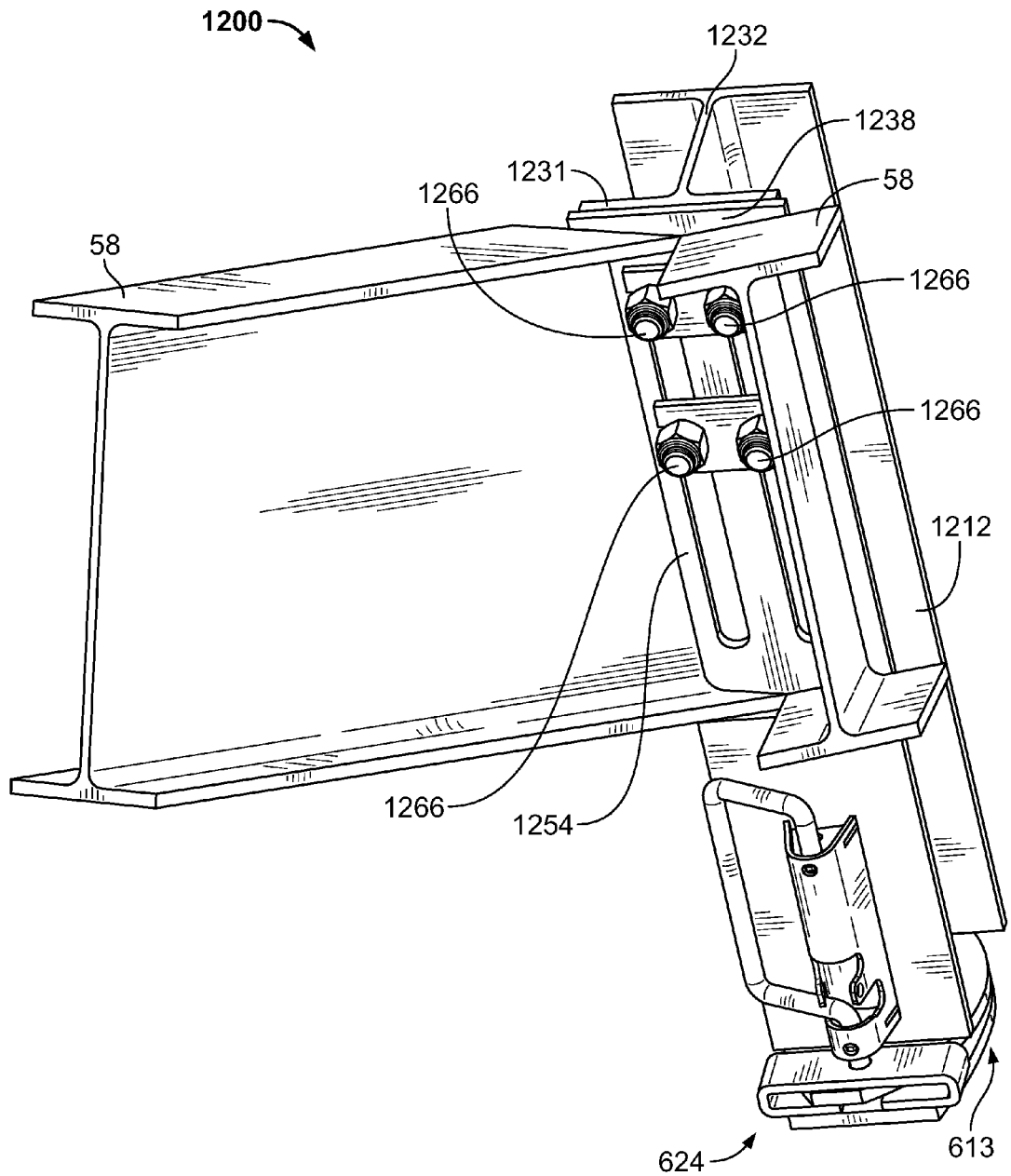
FIG. 21 is a perspective view of other embodiments of a gooseneck coupler with a portion of a towed vehicle attached.

In some embodiments shown in FIG. 21, a gooseneck coupler 1200 may include a coupler body 1212, a hitch ball attachment member 613 and a locking mechanism 624. The coupler body 1212 may include a support member 1230 that may be of a generally I-shaped cross-sectional shape. The support member 1230 may be a generally I-beam shaped member that may be attached to the hitch ball attachment member 613 in any appropriate manner. The support member 1230 may include a generally flat portion 1231 and rear extending portions 1232. The flat portion 1231 may act as an adjustable channel member and the rear extending portion 1232 as a coupler housing.

The coupler body 1212 may include a trailer attachment member 1238 that may be selectively and adjustably attached to the support member 1230 in any appropriate manner. More particularly, the trailer attachment member 1238 may be attached to the generally flat portion 1231 of the support member 1230. The trailer attachment member 1238 may include a generally planar portion 1254. The generally planar portion 1254 may provide a generally flat surface to which a portion of the towed vehicle may attach, such as the frame 58. Further, the gooseneck coupler 1200 may include at least one fastening device 1266, such as the two pairs of clamp bolts shown in FIG. 21.

Figure 22:
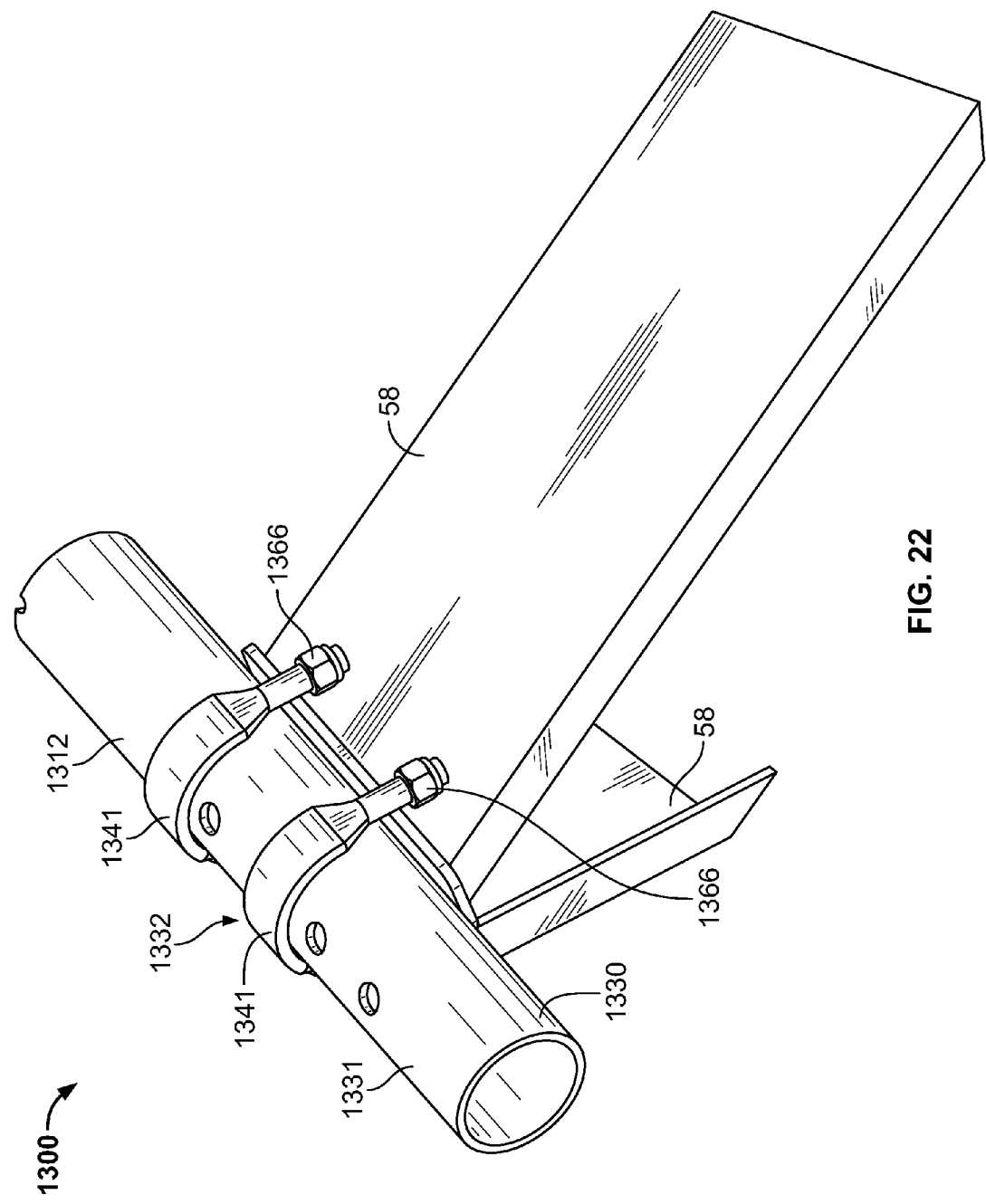
FIG. 22 is a perspective view of other embodiments of a gooseneck coupler with a portion of a towed vehicle attached.
Figure 23:
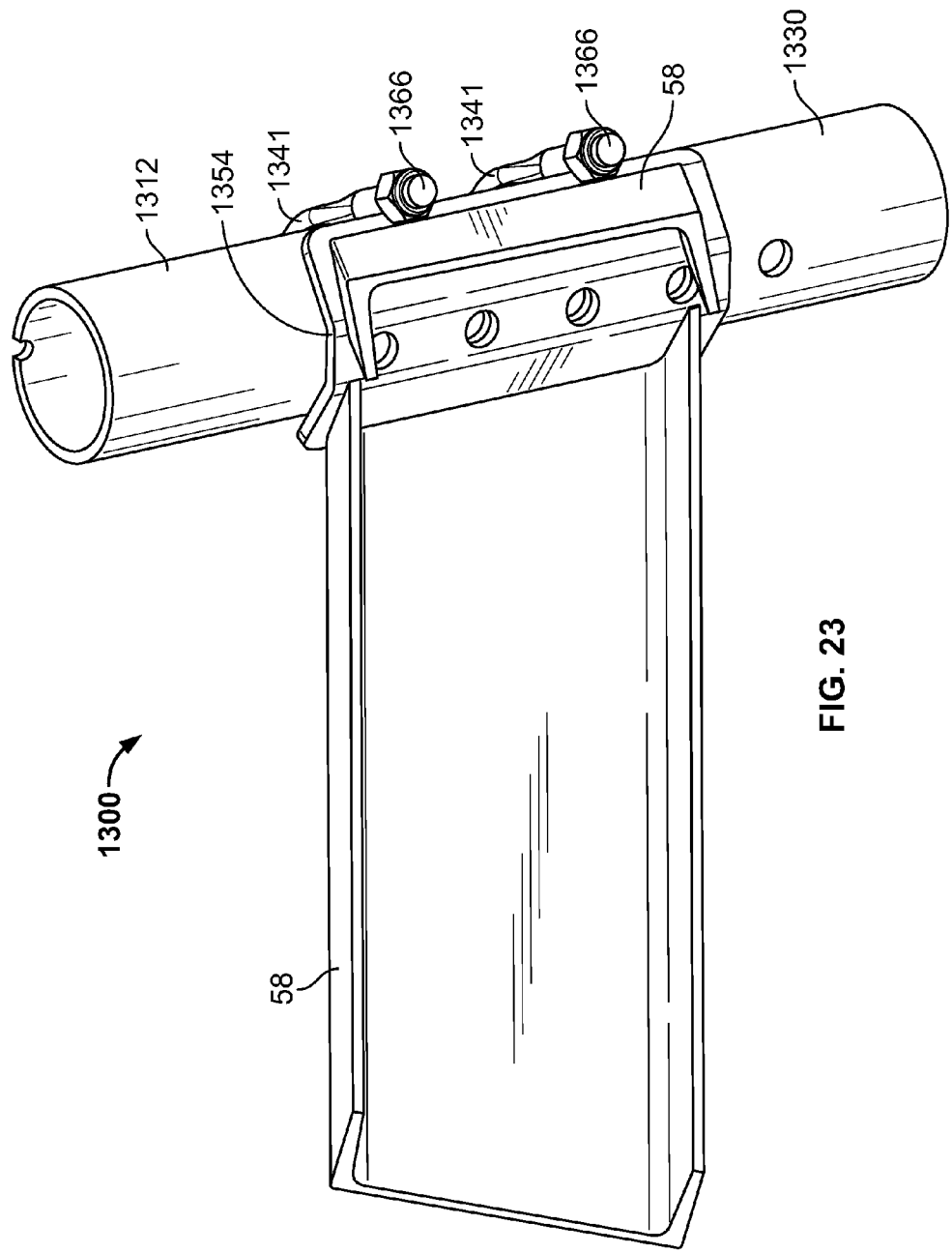
FIG. 23 is a perspective view of a portion the gooseneck coupler of FIG. 22.

In the embodiments shown in FIGS. 22-23, a gooseneck coupler 1300 may include a coupler body 1312, a hitch ball attachment member 13 and a locking mechanism 24. The coupler body 1312 may include a support member 1330 that may be attached to the hitch ball attachment member 13 in any appropriate manner. The support member 1330 may include a tubular member as shown in FIGS. 22-23.

The coupler body 1312 may include a trailer attachment member 1338 that may be selectively and adjustably attached to the support member 1330 in any appropriate manner. By way of a non-limiting example, the trailer attachment member 1338 may include arms 1341 that may generally circumscribe the support member 1330. In some embodiments, a pair of arms 1341 may be used, but the present teachings are not limited to such. Any appropriate number of arms 1341 may be used. The arms 1341 may each include fastening member 1366. The fastening devices 1366 may selectively tighten the arms 1341 around the support member 1330 selectively securing the trailer attachment member 1338 to the support member 1330. The fastening devices 1366 may be loosened and the trailer attachment member 1338 may be selectively positioned along a length of the support member 1330. Once the trailer attachment member 1338 is positioned at the appropriate location, the fastening devices 1366 may be tightened. This may selectively secure the trailer attachment member 1338 to the support member 1330. This may create an appropriate friction fit between the trailer attachment member 1338 and the support member 1330.

The trailer attachment member 1338 may include a generally planar portion 1354, as best shown in FIG. 23. The generally planar portion 1354 may provide a generally flat surface to which a portion of the towed vehicle may attach, such as the frame 58. The frame 58 may be attached to the generally planar portion 1354 in any appropriate manner. This may result in the coupler body 1312 having a generally asymmetrical cross-sectional shape. More particularly, this may allow more material to be positioned fore-aft as opposed to laterally, which may provide additional support for the gooseneck coupler 1300.

Figure 24:
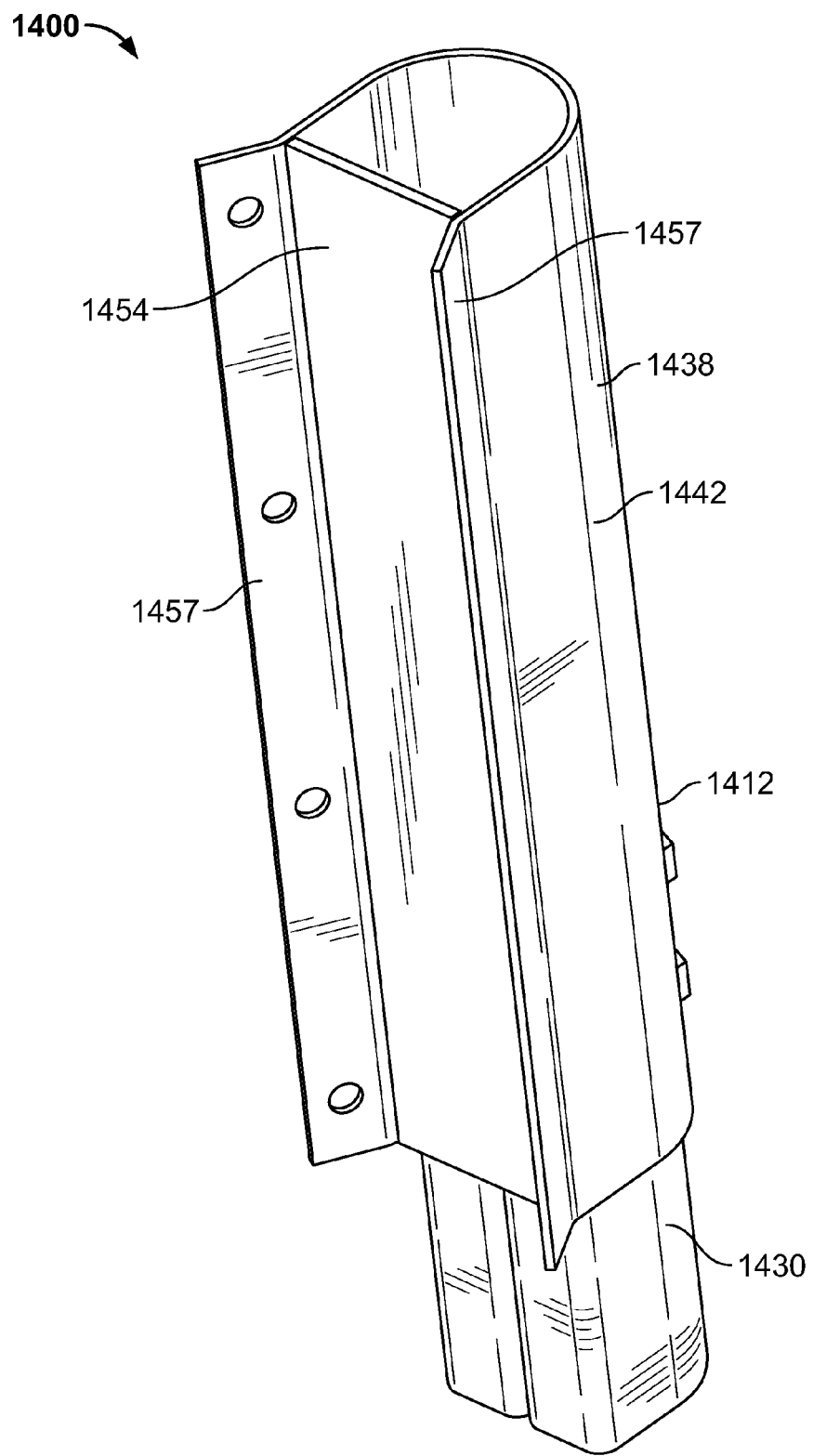
FIG. 24 is a perspective view of a portion of other embodiments of a gooseneck coupler.

In the embodiments shown in FIG. 24, a gooseneck coupler 1400 may include a coupler body 1412, a hitch ball attachment member 13 and a locking mechanism 24. The coupler body 1412 may include a support member 1430 that may be attached to the hitch ball attachment member 13 in any appropriate manner. The support member 1430 may have a generally D-shaped cross-sectional shape.

The coupler body 1412 may include a trailer attachment member 1438 that may be selectively and adjustably attached to the support member 1430 in any appropriate manner. By way of a non-limiting example, the trailer attachment member 1438 may include a generally sleeve or tubular member portion 1442 that may generally circumscribe the support member 1430. The sleeve member 1442 may be of a shape and size to telescopingly engage the support member 1430 and may be selectively secured thereto in any appropriate manner. This may selectively secure the trailer attachment member 1438 to the support member 1430.

The trailer attachment member 1438 may include a generally planar portion 1454, as best shown in FIG. 24. The generally planar portion 1454 may provide a generally flat surface to which a portion of the towed vehicle may attach, such as the frame 58. The frame 58 may be attached to the generally planar portion 1454 in any appropriate manner. This may result in the coupler body 1412 having a generally asymmetrical cross-sectional shape. More particularly, this may allow more material to be positioned fore-aft as opposed to laterally, which may provide additional support for the gooseneck coupler 1400.

In some embodiments, the trailer attachment member 1438 may include winged members 1457 that may extend angularly from the generally planar member 1454 away from the support member 1430. The winged members 1457 may provide additional support for the gooseneck coupler 1400. Specifically, the winged members 1457 may provide additional material in the fore-aft direction to provide additional support fore and aft. The winged members 1457 may also be used to further secure the frame 58 of the towed vehicle to the gooseneck coupler 1400.

Figure 25:
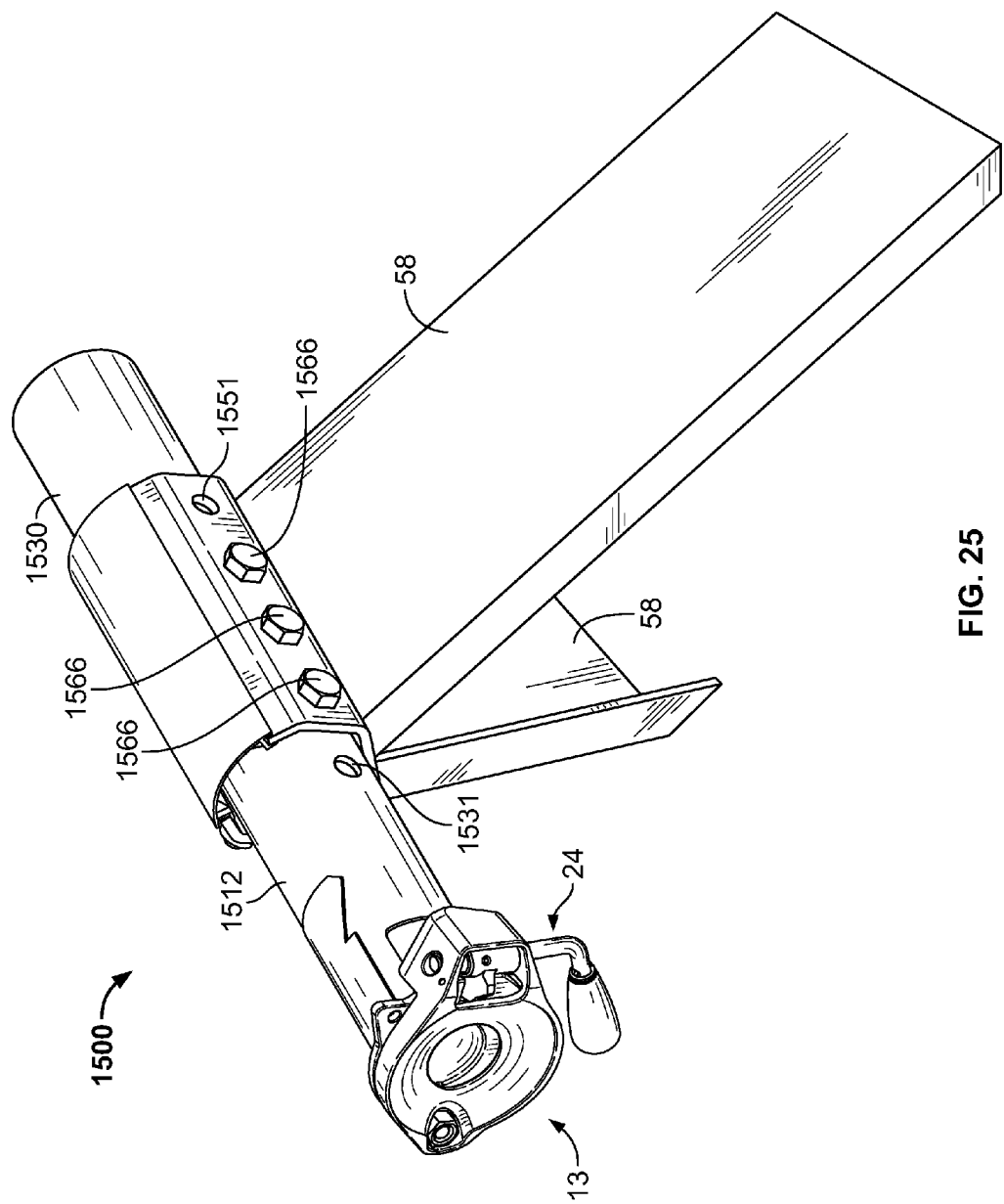
FIG. 25 is a perspective view of other embodiments of a gooseneck coupler with a portion of a towed vehicle attached.
Figure 26:
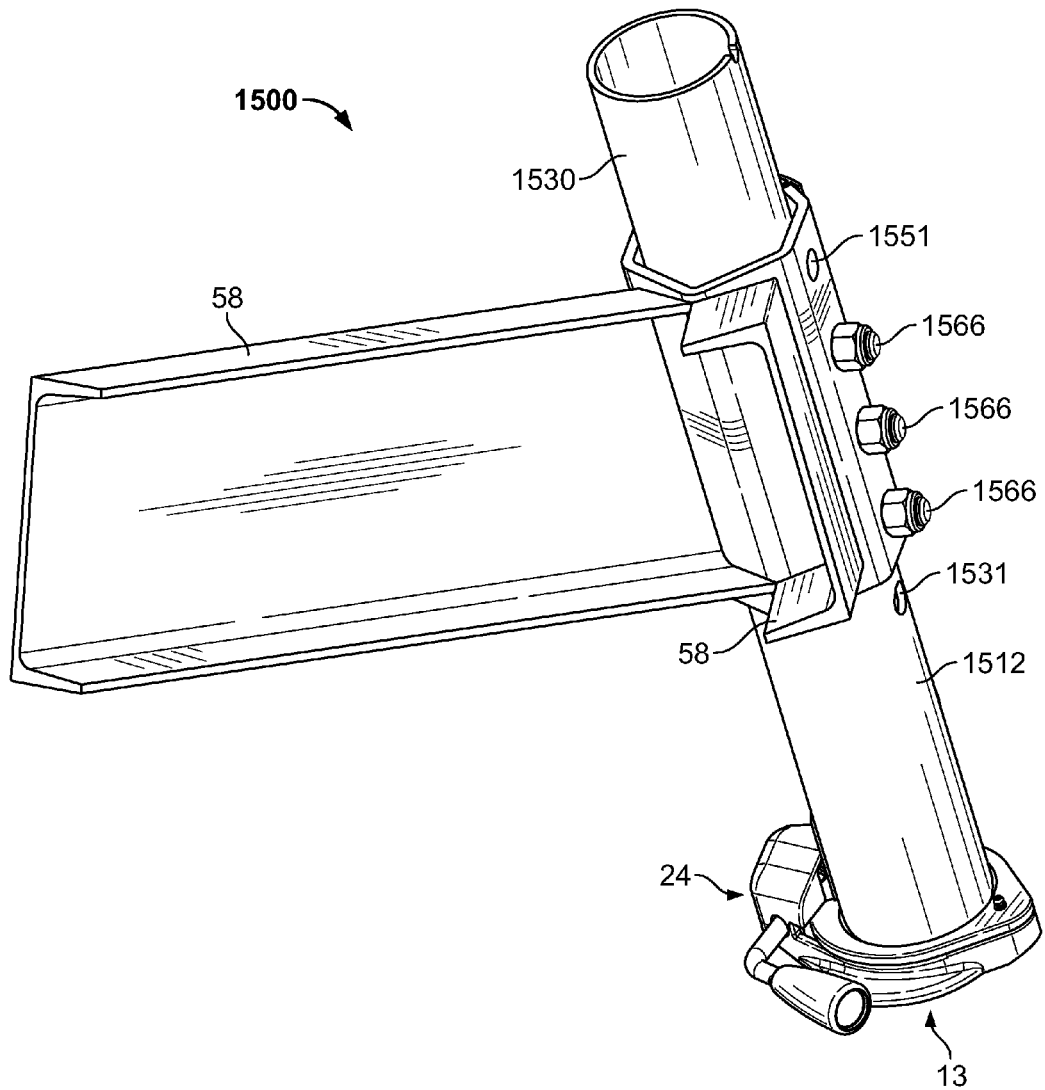
FIG. 26 is a perspective view of a portion the gooseneck coupler of FIG. 25.

In the embodiments shown in FIGS. 25-26, a gooseneck coupler 1500 may include a coupler body 1512, a hitch ball attachment member 13 and a locking mechanism 24. The coupler body 1512 may include a support member 1530 that may be attached to the hitch ball attachment member 13 in any appropriate manner. The support member 1530 may be a generally tubular member. The support member 1530 may include a plurality of apertures 1531, which may selectively secure a trailer attachment member 1538 to the support member 1530.

The trailer attachment member 1538 may be selectively and adjustably attached to the support member 1530 in any appropriate manner. By way of a non-limiting example, the trailer attachment member 1538 may include a generally sleeve or tubular member portion 1542 that may generally circumscribe the support member 1530. The sleeve member 1542 may be of a shape and size to telescopingly engage the support member 1530 and may be selectively secured thereto in any appropriate manner. The sleeve member 1542 may include a trailer attachment member 1538 and a backing member 1539. The backing member 1539 may adjustably attach to the trailer attachment member 1538 to account for support members 1530 of varying diameters. The width of the backing member 1539 may be adjusted to generally allow the trailer attachment member 1538 to circumscribe and selectively attach to support members 1530 of varying diameters. Further, the trailer attachment member 1538 may include a plurality of apertures 1551 that may extend through the trailer attachment member 1538. The apertures 1551, or a plurality of such apertures 1551, may be generally aligned with the apertures 1531 of the support member 1530. More particularly, a plurality of the apertures 1551 may generally align with a plurality of the apertures 1531. A fastening device 1566 may pass through the apertures 1551 and 1531 to selectively secure the trailer attachment member 1538 to the support member 1530.

The trailer attachment member 1538 may include a generally planar portion 1554, as best shown in FIG. 26. The generally planar portion 1554 may provide a generally flat surface to which a portion of the towed vehicle may attach, such as the frame 58. The frame 58 may be attached to the generally planar portion 1554 in any appropriate manner.

Figure 27:
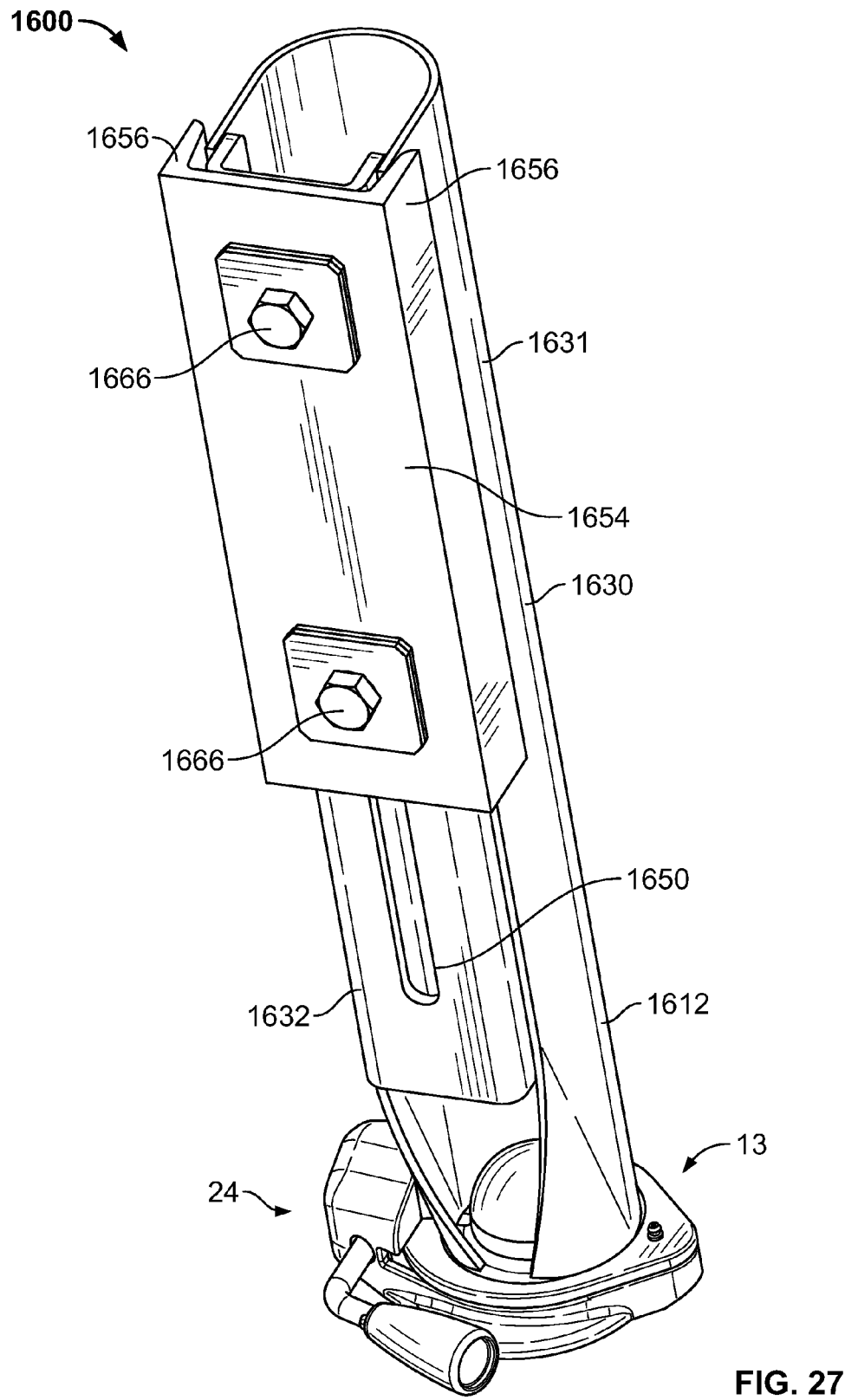
FIG. 27 is a perspective view of other embodiments of a gooseneck coupler.

In the embodiments shown in FIG. 27, a gooseneck coupler 1600 may include a coupler body 1612, a hitch ball attachment member 13 and a locking mechanism 24. The coupler body 1612 may include a support member 1630 that may have a generally asymmetrical cross-sectional shape. The support member 1630 may be formed from a first member or coupler housing 1631 and a second member or adjustable channel member 1632 that may be attached together in any appropriate manner. For example, the first member 1631 may have a generally semi-circular cross-sectional shape. The second member 1632 may have a generally C-shaped cross-sectional shape. The second member 1632 may be secured to the first member 1631 in any appropriate manner, such as by way of non-limiting example, fastening, welding, adhesives or any other method. Securing the second member 1632 to the first member 1631 may form the asymmetrical cross-sectional shape of the support member 1630.

The coupler body 1612 may include a trailer attachment member 1638 that may be selectively and adjustably attached to the support member 1630 in any appropriate manner. By way of a non-limiting example, the second member 1632 of the support member 1630 may include a positioning member 1650. The trailer attachment member 1638 may be selectively positionable at any point along the positioning member 1650. The positioning member 1650 may permit the trailer attachment member 1638 to be selectively positioned along a portion of the length of the support member 1630.

The trailer attachment member 1638 may include a generally planar portion 1654. The generally planar portion 1654 may provide a generally flat surface to which a portion of the towed vehicle may attach, such as the frame 58. The trailer attachment member 1638 may include winged members 1656 that may extend generally perpendicularly from the generally planar member 1654 toward the support member 1630. The winged members 1656 may provide additional support for the gooseneck coupler 1600. Specifically, the winged members 1656 may provide additional material in the fore-aft direction to provide additional support fore and aft. The winged members 1656 may be integrally formed with the generally planar portion 1654, such as casting or bending, or may be attached through a subsequent operation.

Further, the gooseneck coupler 1600 may include at least one fastening device 1666, such as the pair of clamp bolts shown in FIG. 27, which may be selectively attached to the towed vehicle, such as the frame 58 and the trailer attachment member 1638. This may allow the coupler body 1612 to be replaced without any cutting or welding of the frame 58. Portions of the clamp bolts 1666 may be positioned within and generally held within the slot 1650. Another portion of the clamp bolts 1666 may extend outward from the slots 1650. The clamp bolts 1666 may generally engage the support member 1630. Further, the clamp bolts 1666 may generally engage the frame 58 positioned adjacent to the frame attachment member 1638—or more specifically, the generally planar portion 1654. This may selectively attach the frame 58 of the towed vehicle to the support member 1630.

In some embodiments, such as that shown in FIG. 28, a gooseneck coupler 1700 may include a coupler body 1712, a hitch ball attachment member 613 and a locking mechanism 624. The coupler body 1712 may include a support member 1730 that may be of a generally D-shaped cross-sectional shape. This may result in the cross-sectional shape being generally asymmetrical. The support member 1730 may be formed from a first member or coupler housing 1731 and a second member or adjustable channel member 1732 that may be attached together in any appropriate manner. For example, the first member 1731 may have a generally semi-circular or oval cross-sectional shape. The second member 1732 may have a generally C-shaped cross-sectional shape. The second member 1732 may be secured to the first member 1731 forming the D-cross-sectional shape of the support member 1730.

The coupler body 1712 may include a trailer attachment member 1738 that may be selectively and adjustably attached to the support member 1730 in any appropriate manner. By way of a non-limiting example, the support member 1730, or more particularly, the second member 1732, may include a positioning member 1750. The trailer attachment member 1738 may be selectively positionable at any point along the positioning member 1750. The positioning member 1750 may permit the trailer attachment member 1738 to be selectively positioned along a portion of the length of the support member 1730.

The trailer attachment member 1738 may include a generally planar portion 1754 and may include winged members 1756 that may extend generally perpendicularly from the generally planar member 1754 toward the support member 1730. The winged members 1756 may provide additional support for the gooseneck coupler 1700. The generally planar portion 1754 may provide a generally flat surface to which a portion of the towed vehicle may attach, such as the frame 58.

Further, the gooseneck coupler 1700 may include at least one fastening device 1766, such as the pair of clamp bolts shown in FIG. 28, which may be selectively attached to the towed vehicle, such as the frame 58 and the trailer attachment member 1738. This may allow the coupler body 1712 to be replaced without any cutting or welding of the frame 58. Portions of the clamp bolts 1766 may be positioned within and generally held within the slot 1750. Another portion of the clamp bolts 1766 may extend outward from the slot 1750. The gooseneck coupler 1700 may include an indicator aid engaged, such as a biasing or spring member 1768 shown in FIG. 28. The biasing member 1768 may generally retain the clamp bolts 1766 within the slot 1750 and may permit the clamp bolts 1766 to be loosened without being generally removed from the slot 1750 and generally retained in a selected position. The clamp bolts 1766 may generally engage the support member 1730. Further, the clamp bolts 1766 may generally engage the frame 58 positioned adjacent to the frame attachment member 1738—or more specifically, the generally planar portion 1754. This may selectively attach the frame 58 of the towed vehicle to the support member 1730. The biasing member 1768 may assist with engaging the clamp bolts 1766 with the support member 1730 and/or frame 58 by keeping the clamp bolts 1766 within the slot 1750 and retaining the same at the appropriate position. The biasing member 1768 may be used with any of the embodiments shown and described herein.

Figure 29:
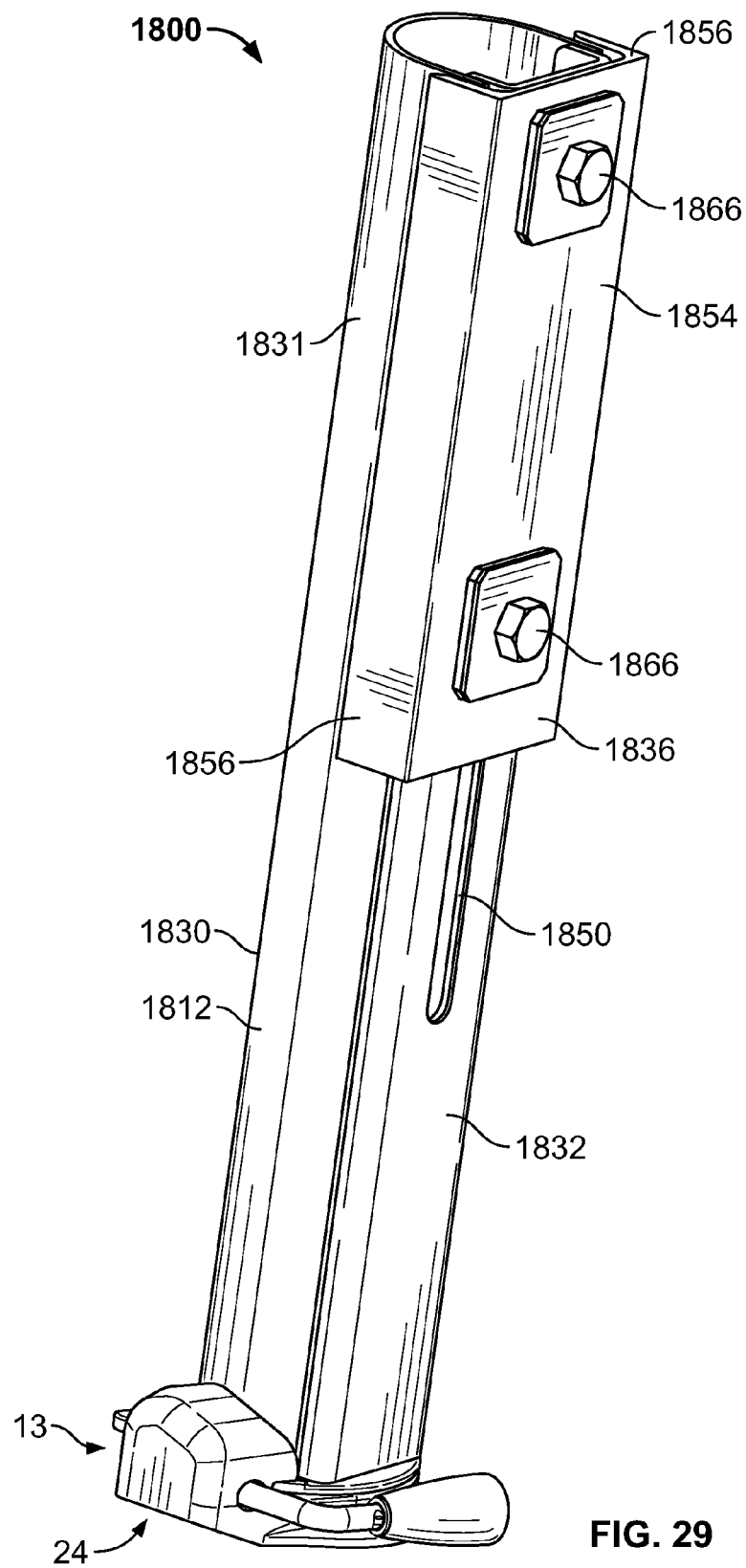
FIG. 29 is a perspective view of other embodiments of a gooseneck coupler.

In some embodiments, such as that shown in FIG. 29, a gooseneck coupler 1800 may include a coupler body 1812, a hitch ball attachment member 13 and a locking mechanism 24. The coupler body 1812 may include a support member 1830 that may be of a generally D-shaped cross-sectional shape. This may result in the cross-sectional shape being generally asymmetrical. The support member 1830 may be formed from a first member or coupler housing 1831 and a second member or adjustable channel member 1832 that may be attached together in any appropriate manner. For example, the first member 1831 may have a generally semi-circular or oval cross-sectional shape. The second member 1832 may have a generally C-shaped cross-sectional shape. The second member 1832 may be secured to the first member 1831 forming the D-cross-sectional shape of the support member 1830.

The coupler body 1812 may include a trailer attachment member 1838 that may be selectively and adjustably attached to the support member 1830 in any appropriate manner. By way of a non-limiting example, the support member 1830 may include a positioning member 1850. The trailer attachment member 1838 may be selectively positionable at any point along the positioning member 1850. The positioning member 1850 may permit the trailer attachment member 1838 to be selectively positioned along a portion of the length of the support member 1830.

The trailer attachment member 1838 may include a generally planar portion 1854 and may include winged members 1856 that may extend generally perpendicularly from the generally planar member 1854 toward the support member 1830. The winged members 1856 may provide additional support for the gooseneck coupler 1800. The generally planar portion 1854 may provide a generally flat surface to which a portion of the towed vehicle may attach, such as the frame 58.

Further, the gooseneck coupler 1800 may include at least one fastening device 1866, such as the pair of clamp bolts shown in FIG. 29, which may be selectively attached to the towed vehicle, such as the frame 58 and the trailer attachment member 1638. This may allow the coupler body 1812 to be replaced without any cutting or welding of the frame 58. Portions of the clamp bolts 1866 may be positioned within and generally held within the slot 1850. Another portion of the clamp bolts 1866 may extend outward from the slots 1850. The clamp bolts 1866 may generally engage the support member 1830. Further, the clamp bolts 1866 may generally engage the frame 58 positioned adjacent to the frame attachment member 1838—or more specifically, the generally planar portion 1854. This may selectively attach the frame 58 of the towed vehicle to the support member 1830.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, the following is claimed:

1. A gooseneck coupler comprising:
a hitch ball attachment member selectively securable to a hitch ball of a towing vehicle;
a support member attached to the hitch ball attachment member, the support member including first and second ends; and
a trailer attachment member configured to secure a portion of a towed vehicle thereto, the trailer attachment member positionable on the support member between the first and second ends of the support member, wherein the trailer attachment member circumscribes only a portion of a perimeter of the support member regardless of the trailer attachment member's position between the first and second ends of the support member.

2. The gooseneck coupler of claim 1, wherein the trailer attachment member is continuously positionable on the support member between the first and second ends.

3. The gooseneck coupler of claim 2, wherein the support member includes an axis, and the trailer attachment member is configured to secure the portion of the towed vehicle thereto at an infinite number of positions between ends of a slot on the support member and along the axis.

4. The gooseneck coupler of claim 1, wherein the support member is free of telescoping relation with the hitch ball attachment member.

5. The gooseneck coupler of claim 1, wherein the trailer attachment member includes a generally planar portion configured to secure the portion of the towed vehicle to the trailer attachment member.

6. The gooseneck coupler of claim 1, wherein the support member includes an asymmetrical cross sectional shape that is asymmetrical relative to a plane that is generally parallel to the location of attachment of the towed vehicle wherein said plane extends through a center axis of the support member.

7. A gooseneck coupler comprising:
a hitch ball attachment member configured to be selectively secured to a hitch ball positioned on a load bed of a towing vehicle; and
a coupler body attached to the hitch ball attachment member, the coupler body configured to attach to a portion of a towed vehicle, wherein the coupler includes an asymmetrical cross sectional shape that is asymmetrical relative to a plane that is generally parallel to the location of attachment of the towed vehicle wherein said plane extends through a center axis of the coupler body.

8. The gooseneck coupler of claim 7, wherein the coupler body comprises:
a support member attached to the hitch ball attachment member, the support member including first and second ends; and
a trailer attachment member configured to secure the portion of the towed vehicle thereto, the trailer attachment member positionable on the support member between the first and second ends of the support member.

9. The gooseneck coupler of claim 8, wherein the support member has a cross-sectional shape selected from the group consisting of: pentagonal, circular, rectangular, square, C-shaped, I-shaped, U-shaped, and D-shaped.

10. The gooseneck coupler of claim 8, wherein the support member is of a shape selected from the group of a generally hollow tubular member, an I-beam member, a C-channel member, and a solid member.

11. The gooseneck coupler of claim 8, wherein the support member includes a coupler housing attached with an adjustable channel member.

12. The gooseneck coupler of claim 8, wherein the trailer attachment member circumscribes only a portion of the support member.

13. The gooseneck coupler of claim 8, wherein the trailer attachment member includes a generally planar portion configured to have attached thereto the portion of the towed vehicle.

14. A gooseneck coupler comprising:
a hitch ball attachment member configured to be selectively secured to a hitch ball of a towing vehicle;
a support member attached to and extending from the hitch ball attachment member; and
a trailer attachment member selectively secured to the support member, the trailer attachment member attachable to a portion of a towed vehicle, wherein the support member includes an asymmetrical cross sectional shape that is asymmetrical relative to a plane that is generally parallel to the location of attachment of the towed vehicle wherein said plane extends through a center axis of the support member.

15. The gooseneck coupler of claim 14, wherein the trailer attachment member is continuously positionable on the support member between first and second ends of a coupler assembly.

16. A gooseneck coupler comprising:
a hitch ball attachment member selectively securable to a hitch ball of a towing vehicle;
a support member attached to and extending from the hitch ball attachment member along a common axis; and
a trailer attachment member selectively secured to the support member, the trailer attachment member attachable to a portion of a towed vehicle, wherein the support member includes an asymmetrical cross sectional shape that is asymmetrical in a fore and aft direction relative to a side to side direction wherein the fore and aft direction is a general direction of travel of the towing vehicle.

* * * * *